US012732251B2

(12) United States Patent
Lee et al.

(10) Patent No.: US 12,732,251 B2
(45) Date of Patent: Sep. 8, 2026

(54) CHANNEL QUALITY REPORTING FOR FULL DUPLEX SYSTEMS

(71) Applicant: Samsung Electronics Co., Ltd., Suwon-si (KR)

(72) Inventors: Gilwon Lee, McKinney, TX (US); Md. Saifur Rahman, Plano, TX (US); Marian Rudolf, Longueuil (CA); Eko Onggosanusi, Coppell, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/597,834

(22) Filed: Mar. 6, 2024

(65) Prior Publication Data

US 2024/0313840 A1 Sep. 19, 2024

Related U.S. Application Data

(60) Provisional application No. 63/452,953, filed on Mar. 17, 2023.

(51) Int. Cl.

*H04B 7/06* (2006.01)
*H04L 5/14* (2006.01)
*H04W 72/231* (2023.01)

(52) U.S. Cl.

CPC ......... *H04B 7/0626* (2013.01); *H04B 7/0632* (2013.01); *H04L 5/14* (2013.01); *H04W 72/231* (2023.01)

(58) Field of Classification Search

CPC ... H04B 7/0626; H04B 7/0632; H04L 5/0057; H04L 5/14; H04W 72/231

See application file for complete search history.

(56) References Cited

U.S. PATENT DOCUMENTS

| | | | | |
|---|---|---|---|---|
| 2020/0220585 | A1 | 7/2020 | Wilson | |
| 2022/0014954 | A1* | 1/2022 | Ibrahim | H04W 72/21 |
| 2024/0014962 | A1* | 1/2024 | Ibrahim | H04B 7/06954 |
| 2025/0159714 | A1* | 5/2025 | Zhang | H04L 5/0092 |
| 2025/0193909 | A1* | 6/2025 | Zhang | H04L 5/14 |

OTHER PUBLICATIONS

"LTE; Evolved Universal Terrestrial Radio Access (E-UTRA); Physical channels and modulation (3GPP TS 36.211 version 17.3.0 Release 17)", ETSI TS 136 211 V17.3.0, Apr. 2023, 248 pages.

(Continued)

*Primary Examiner* — Kashif Siddiqui

(57) ABSTRACT

Apparatuses and methods for channel quality reporting for full duplex systems. A method performed by a user equipment (UE) includes receiving information about a channel state information (CSI) report associated with N>1 hypotheses. A first hypothesis of the N hypotheses is associated with a channel quality indicator (CQI) for subband full duplex (SBFD) slots or symbols. A second hypothesis of the N hypotheses is associated with a CQI for non-SBFD slots or symbols. The method further includes identifying whether a slot or symbol is SBFD or non-SBFD; determining, based on the identification, a CQI using the first or second hypotheses; and transmitting the CSI report, including the determined CQI.

20 Claims, 12 Drawing Sheets

(56) References Cited

OTHER PUBLICATIONS

"LTE; Evolved Universal Terrestrial Radio Access (E-UTRA); Multiplexing and channel coding (3GPP TS 36.212 version 17.1.0 Release 17)", ETSI TS 136 212 V17.1.0, Apr. 2022, 264 pages.
"LTE; Evolved Universal Terrestrial Radio Access (E-UTRA); Physical layer procedures (3GPP TS 36.213 version 17.3.0 Release 17)", ETSI TS 136 213 V17.3.0, Oct. 2022, 586 pages.
"LTE; Evolved Universal Terrestrial Radio Access (E-UTRA); Medium Access Control (MAC) protocol specification (3GPP TS 36.321 version 17.3.0 Release 17)", ETSI TS 136 321 V17.3.0, Jan. 2023, 148 pages.
"LTE; Evolved Universal Terrestrial Radio Access (E-UTRA); Radio Resource Control (RRC); Protocol specification (3GPP TS 36.331 version 17.3.0 Release 17)", ETSI TS 136 331 V17.3.0, Jan. 2023, 1140 pages.
"3rd Generation Partnership Project; Technical Specification Group Services and System Aspects; Feasibility Study on New Services and Markets Technology Enablers; Stage 1 (Release 14)", 3GPP TR 22.891 V1.2.0, Nov. 2015, 96 pages.
"5G; NR; Multiplexing and channel coding (3GPP TS 38.212 version 17.4.0 Release 17)", ETSI TS 138 212 V17.4.0, Jan. 2023, 206 pages.
"5G; NR; Physical layer procedures for data (3GPP TS 38.214 version 17.4.0 Release 17)", ETSI TS 138 214 V17.4.0, Jan. 2023, 236 pages.
"5G; NR; Physical channels and modulation (3GPP TS 38.211 version 17.4.0 Release 17)", ETSI TS 138 211 V17.4.0, Jan. 2023, 141 pages.
"5G; NR; Physical layer procedures for control (3GPP TS 38.213 version 17.4.0 Release 17)", ETSI TS 138 213 V17.4.0, Jan. 2023, 263 pages.
"5G; NR; Radio Resource Control (RRC); Protocol specification (3GPP TS 38.331 version 17.3.0 Release 17)", ETSI TS 138 331 V17.3.0, Jan. 2023, 1295 pages.
International Search Report and Written Opinion issued Jun. 26, 2024 regarding International Application No. PCT/KR2024/095559, 7 pages.
ETRI, "Discussion on subband non-overlapping full duplex enhancements", 3GPP TSG RAN WG1 #112, R1-2301044, Feb. 2023, 18 pages.
Intel Corporation, "On SBFD in NR systems", 3GPP TSG RAN WG1 #112, R1-2300946, Feb. 2023, 19 pages.
Qualcomm Incorporated, "Feasibility and techniques for Subband non-overlapping full duplex", 3GPP TSG RAN WG1, Meeting #110, R1-2207231, Aug. 2022, 28 pages.
Moderator (CATT), "Summary #5 of subband non-overlapping full duplex", 3GPP TSG RAN WG1 #110, R1-2208122, Aug. 2022, 99 pages.
Supplementary European Search Report dated Apr. 13, 2026, in connection with European Patent Application No. 24775264.5, 11 pages.
LG Electronics, "Study on Subband non-overlapping full duplex," R1-2301064, 3GPP TSG RAN WG1 #112, Athens, Greece, Feb. 27-Mar. 3, 2023, 16 pages.
NTT Docomo, Inc., "Discussion on subband non-overlapping full duplex," R1-2209902, 3GPP TSG RAN WG1 #110bis-e, e-Meeting, Oct. 10-19, 2022, 17 pages.

* cited by examiner

CHANNEL QUALITY REPORTING FOR FULL DUPLEX SYSTEMS

CROSS-REFERENCE TO RELATED APPLICATION AND CLAIM OF PRIORITY

This application claims priority under 35 U.S.C. § 119(e) to U.S. Provisional Patent Application No. 63/452,953 filed on Mar. 17, 2023, which provisional patent application is hereby incorporated by reference in its entirety.

TECHNICAL FIELD

The present disclosure relates generally to wireless communication systems and, more specifically, to channel quality reporting for full duplex systems.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

This disclosure relates to apparatuses and methods for channel quality reporting for full duplex systems.

In one embodiment, a user equipment (UE) is provided. The UE includes a transceiver configured to receive information about a channel state information (CSI) report associated with N>1 hypotheses. A first hypothesis of the N hypotheses is associated with a channel quality indicator (CQI) for a first type of slots or symbols. A second hypothesis of the N hypotheses is associated with a CQI for a second type of slots or symbols. The UE further includes a processor operably coupled to the transceiver. The processor is configured to identify whether a slot or symbol is of the first type or the second type and determine, based on the identification, a CQI using the first or second hypotheses. The transceiver is further configured to transmit the CSI report, including the determined CQI. The first type of slots or symbols correspond to subband full duplex (SBFD) slots or symbols. The second type of slots or symbols correspond to non-SBFD slots or symbols.

In another embodiment, a base station (BS) is provided. The BS includes a processor and a transceiver operably coupled to the processor. The transceiver is configured to transmit information about a CSI report associated with N>1 hypotheses. A first hypothesis of the N hypotheses is associated with a CQI for a first type of slots or symbols. A second hypothesis of the N hypotheses is associated with a CQI for a second type of slots or symbols. The transceiver is further configured to receive the CSI report including a CQI associated with the first or second hypotheses based on whether a slot or symbol is of the first type or the second type. The first type of slots or symbols correspond to SBFD slots or symbols. The second type of slots or symbols correspond to non-SBFD slots or symbols.

In yet another embodiment, a method performed by a UE is provided. The method includes receiving information about a CSI report associated with N>1 hypotheses. A first hypothesis of the N hypotheses is associated with a CQI for a first type of slots or symbols. A second hypothesis of the N hypotheses is associated with a CQI for a second type of slots or symbols. The method further includes identifying whether a slot or symbol is of the first type or the second type; determining, based on the identification, a CQI using the first or second hypotheses; and transmitting the CSI report, including the determined CQI. The first type of slots or symbols correspond to SBFD slots or symbols. The second type of slots or symbols correspond to non-SBFD slots or symbols.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
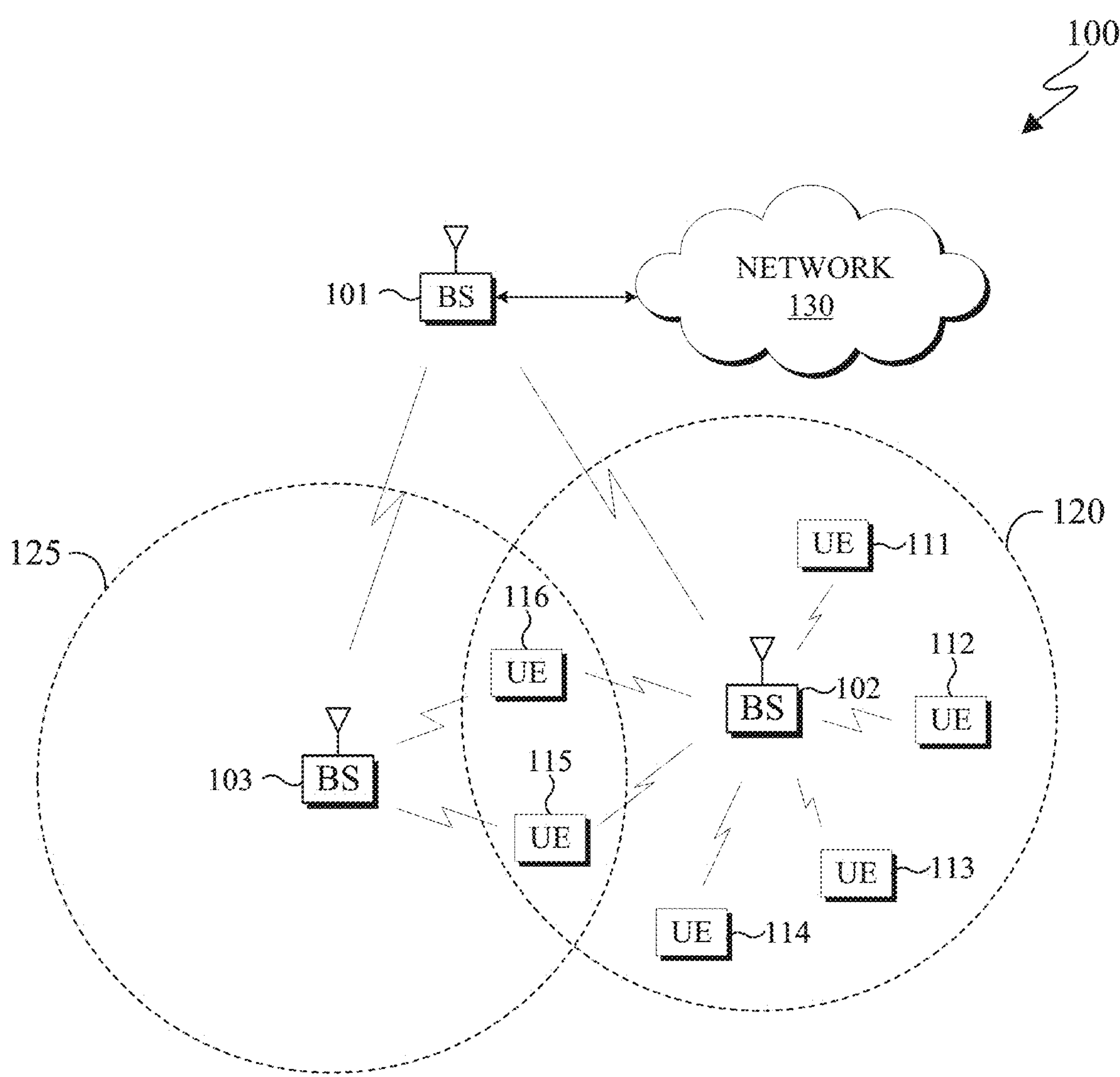
FIG. 1 illustrates an example wireless network according to embodiments of the present disclosure.

FIGS. 1 through 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

The following documents and standards descriptions are hereby incorporated by reference into the present disclosure as if fully set forth herein: 3GPP TS 36.211 v17.3.0, "E-UTRA, Physical channels and modulation (herein "REF 1");" 3GPP TS 36.212 v17.1.0, "E-UTRA, Multiplexing and Channel coding" (herein "REF 2"); 3GPP TS 36.213 v17.3.0, "E-UTRA, Physical Layer Procedures" (herein "REF 3"); 3GPP TS 36.321 v17.3.0, "E-UTRA, Medium Access Control (MAC) protocol specification" (herein "REF 4"); 3GPP TS 36.331 v17.3.0, "E-UTRA, Radio Resource Control (RRC) Protocol Specification" (herein "REF 5"); 3GPP TR 22.891 v1.2.0 (herein "REF 6"); 3GPP TS 38.212 v17.4.0, "E-UTRA, NR, Multiplexing and Channel coding" (herein "REF 7"); 3GPP TS 38.214 v17.4.0, "E-UTRA, NR, Physical layer procedures for data" (herein "REF 8"); 3GPP TS 38.211 v17.4.0, "E-UTRA, NR, Physical channels and modulation" (herein "REF 9"); 3GPP TS 38.213 v17.4.0, "NR, Physical Layer Procedures for Control" (herein "REF 10"); 3GPP TS 38.331 v17.3.0, "NR, Radio Resource Control (RRC) Protocol Specification" (herein "REF 11").

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage is of paramount importance.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (COMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Figure 2:
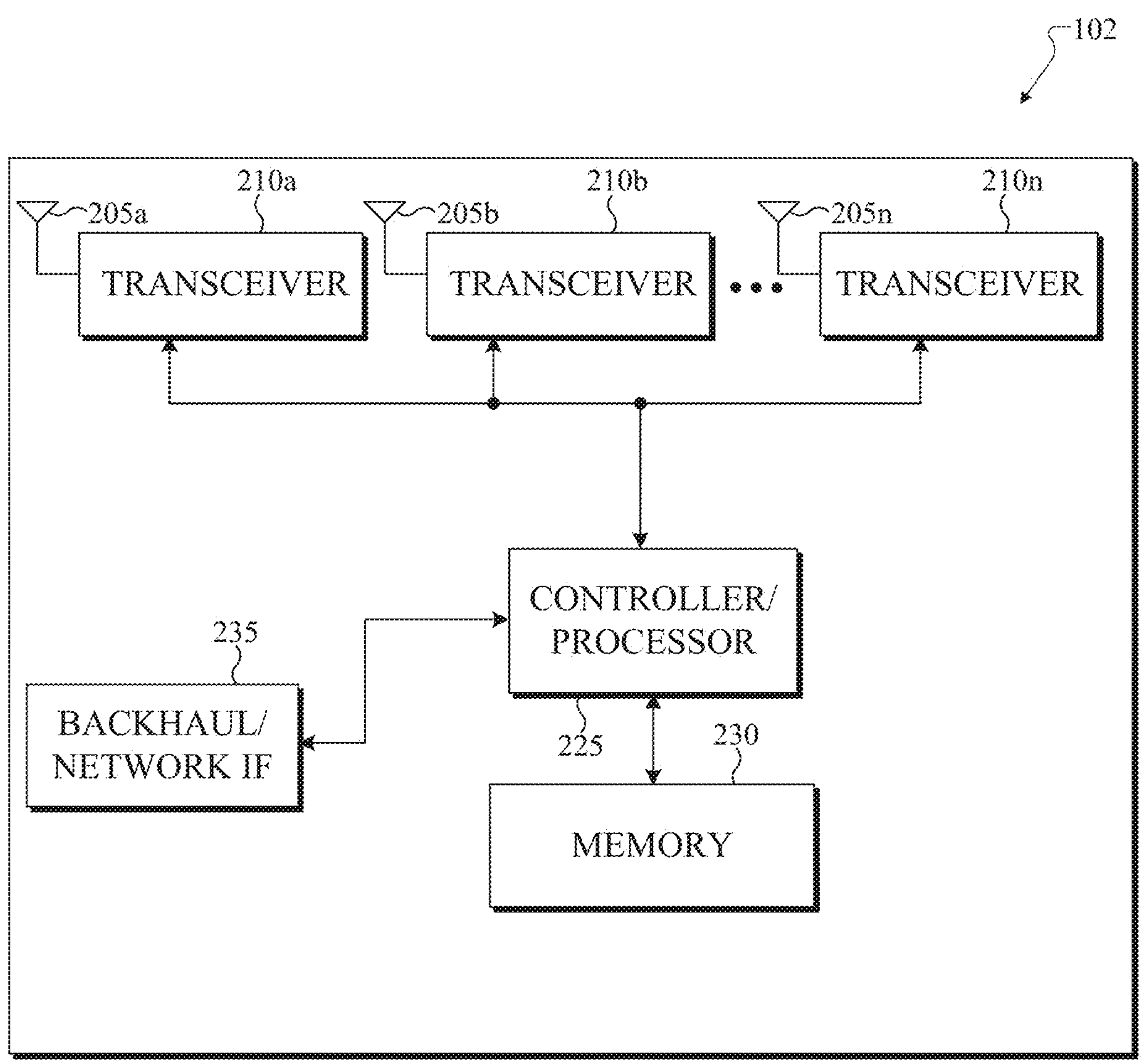
FIG. 2 illustrates an example gNodeB (gNB) according to embodiments of the present disclosure.
Figure 3:
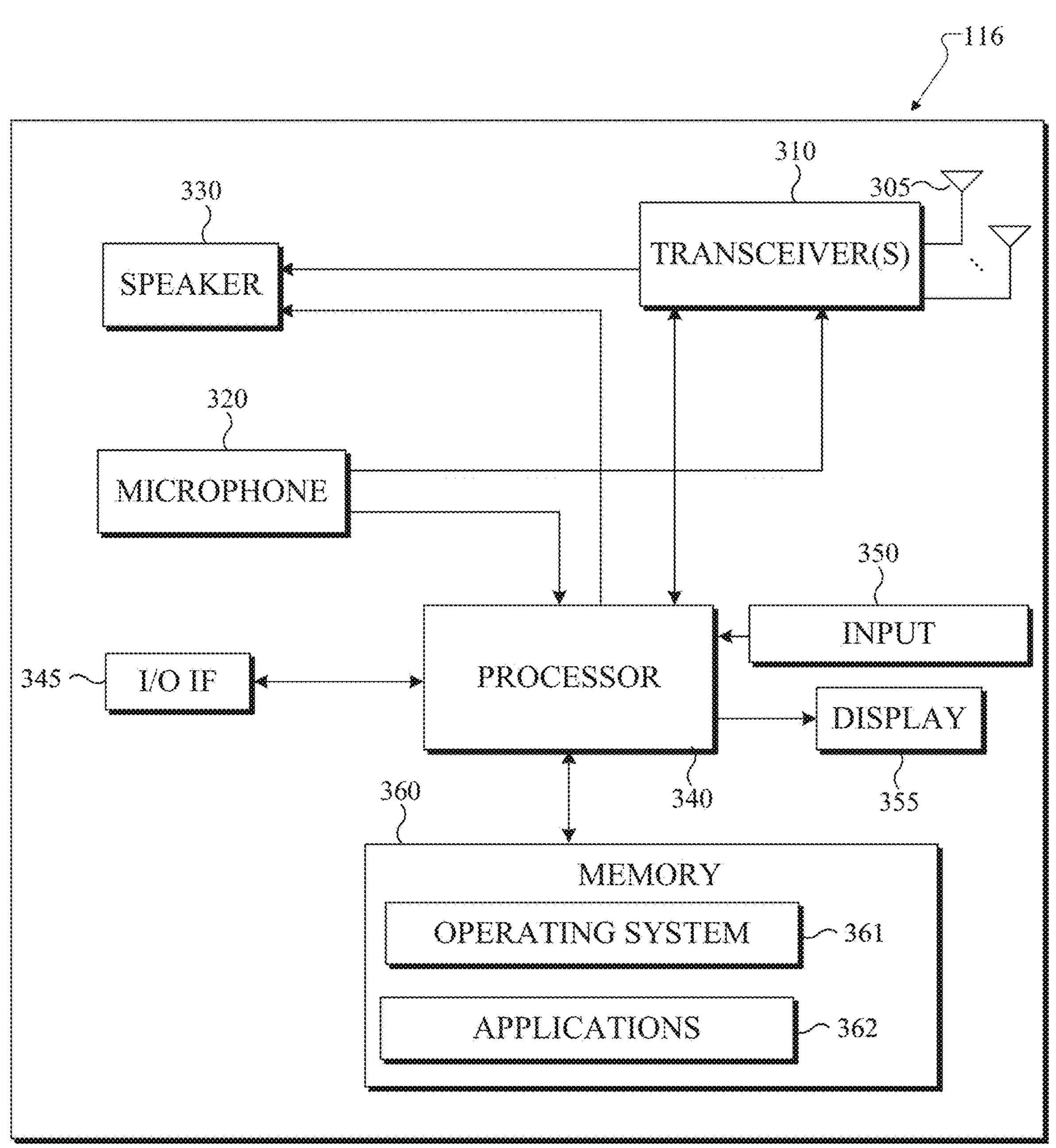
FIG. 3 illustrates an example user equipment (UE) according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3rd generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof for channel quality reporting for full duplex systems. In certain embodiments, one or more of the BSs 101-103 include circuitry, programing, or a combination thereof for supporting channel quality reporting for full duplex systems.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas **205*a*-205*n*, multiple transceivers 210*a*-210*n*, a controller/processor 225, a memory 230, and a backhaul or network interface 235**.

The transceivers **210*a*-210*n* receive, from the antennas 205*a*-205*n*, incoming RF signals, such as signals transmitted by UEs in the network 100. The transceivers 210*a*-210*n* down-convert the incoming RF signals to generate IF or baseband signals. The IF or baseband signals are processed by receive (RX) processing circuitry in the transceivers 210*a*-210*n* and/or controller/processor 225, which generates processed baseband signals by filtering, decoding, and/or digitizing the baseband or IF signals. The controller/processor 225** may further process the baseband signals.

Transmit (TX) processing circuitry in the transceivers **210*a*-210*n* and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210*a*-210*n* up-converts the baseband or IF signals to RF signals that are transmitted via the antennas 205*a*-205*n***.

The controller/processor 225 can include one or more processors or other processing devices that control the overall operation of the gNB 102. For example, the controller/processor 225 could control the reception of UL channel signals and the transmission of DL channel signals by the transceivers **210*a*-210*n* in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205*a*-205*n* are weighted differently to effectively steer the outgoing signals in a desired direction. As another example, the controller/processor 225 could support methods for supporting compression-based CSI reporting. Any of a wide variety of other functions could be supported in the gNB 102 by the controller/processor 225**.

The controller/processor 225 is also capable of executing programs and other processes resident in the memory 230, such as processes for supporting channel quality reporting for full duplex systems. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives from the antenna 305, an incoming RF signal transmitted by a gNB of the network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360, such as processes for channel quality reporting for full duplex systems. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350, which includes for example, a touchscreen, keypad, etc., and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figures 4, 5:
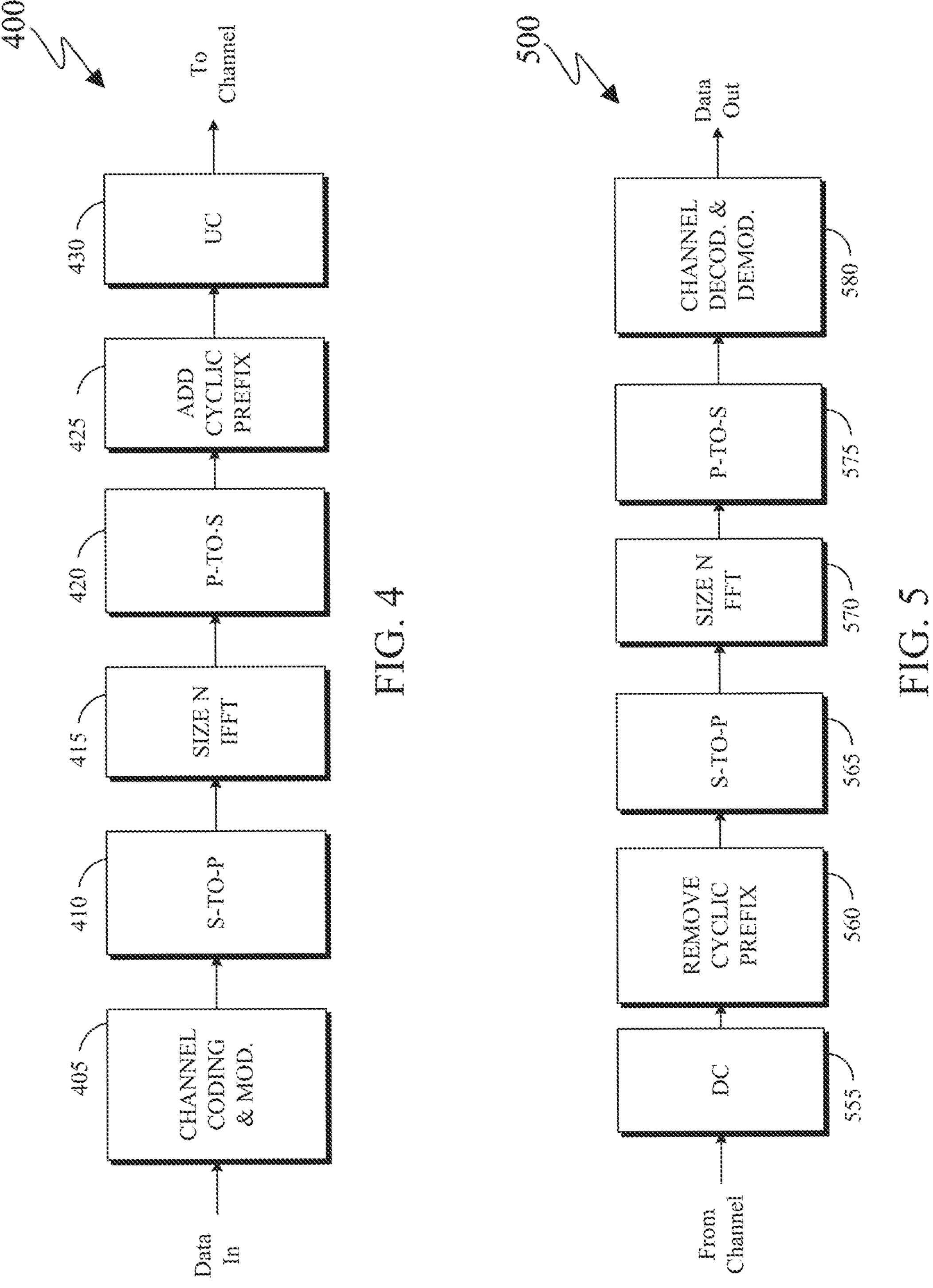
FIGS. 4 and 5 illustrate example wireless transmit and receive paths according to embodiments of the present disclosure.

FIG. 4 and FIG. 5 illustrate example wireless transmit and receive paths according to this disclosure. In the following description, a transmit path 400, of FIG. 4, may be described as being implemented in a BS (such as the BS 102), while a receive path 500, of FIG. 5, may be described as being implemented in a UE (such as a UE 116). However, it may be understood that the receive path 500 can be implemented in a BS and that the transmit path 400 can be implemented in a UE. In some embodiments, the transmit path 400 is configured to support channel quality reporting for full duplex systems as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols. The serial-to-parallel block 410 converts (such as de-multiplexes) the serial modulated symbols to parallel data in order to generate N parallel symbol streams, where N is the IFFT/FFT size used in the BS 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the BS 102 arrives at the UE 116 after passing through the wireless channel, and reverse operations to those at the BS 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the BSs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the BSs 101-103 and may implement the receive path 500 for receiving in the downlink from the BSs 101-103.

Each of the components in FIG. 4 and FIG. 5 can be implemented using hardware or using a combination of hardware and software/firmware. As a particular example, at least some of the components in FIGS. 4 and FIG. 5 may be implemented in software, while other components may be implemented by configurable hardware or a mixture of software and configurable hardware. For instance, the FFT block 570 and the IFFT block 415 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

A communication system includes a downlink (DL) that conveys signals from transmission points such as base stations (BSs) or NodeBs to user equipments (UEs) and an Uplink (UL) that conveys signals from UEs to reception points such as NodeBs. A UE, also commonly referred to as a terminal or a mobile station, may be fixed or mobile and may be a cellular phone, a personal computer device, or an automated device. An eNodeB, which is generally a fixed station, may also be referred to as an access point or other equivalent terminology. For LTE systems, a NodeB is often referred as an eNodeB.

In a communication system, such as LTE, DL signals can include data signals conveying information content, control signals conveying DL control information (DCI), and reference signals (RS) that are also known as pilot signals. An eNodeB transmits data information through a physical DL shared channel (PDSCH). An eNodeB transmits DCI through a physical DL control channel (PDCCH) or an Enhanced PDCCH (EPDCCH)—see also REF 3. An eNodeB transmits acknowledgement information in response to data transport block (TB) transmission from a UE in a physical hybrid ARQ indicator channel (PHICH). An eNodeB transmits one or more of multiple types of RS including a UE-common RS (CRS), a channel state information RS (CSI-RS), or a demodulation RS (DMRS). A CRS is transmitted over a DL system bandwidth (BW) and can be used by UEs to obtain a channel estimate to demodulate data or control information or to perform measurements. To reduce CRS overhead, an eNodeB may transmit a CSI-RS with a smaller density in the time and/or frequency domain than a CRS. DMRS can be transmitted only in the BW of a respective PDSCH or EPDCCH and a UE can use the DMRS to demodulate data or control information in a PDSCH or an EPDCCH, respectively. A transmission time interval for DL channels is referred to as a subframe and can have, for example, duration of 1 millisecond.

DL signals also include transmission of a logical channel that carries system control information. A BCCH is mapped to either a transport channel referred to as a broadcast channel (BCH) when the DL signals convey a master information block (MIB) or to a DL shared channel (DL-SCH) when the DL signals convey a System Information Block (SIB). Most system information is included in different SIBs that are transmitted using DL-SCH. A presence of system information on a DL-SCH in a subframe can be indicated by a transmission of a corresponding PDCCH conveying a codeword with a cyclic redundancy check (CRC) scrambled with system information RNTI (SI-RNTI). Alternatively, scheduling information for a SIB transmission can be provided in an earlier SIB and scheduling information for the first SIB (SIB-1) can be provided by the MIB.

DL resource allocation is performed in a unit of subframe and a group of physical resource blocks (PRBs). A transmission BW includes frequency resource units referred to as resource blocks (RBs). Each RB includes $$N_{sc}^{RB}$$

sub-carriers, or resource elements (REs), such as 12 REs. A unit of one RB over one subframe is referred to as a PRB. A UE can be allocated $M_{PDSCH}$ RBs for a total of $$M_{sc}^{PDSCH} = M_{PDSCH} \cdot N_{sc}^{RB}$$

REs for the PDSCH transmission BW.

UL signals can include data signals conveying data information, control signals conveying UL control information (UCI), and UL RS. UL RS includes DMRS and Sounding RS (SRS). A UE transmits DMRS only in a BW of a respective PUSCH or PUCCH. An eNodeB can use a DMRS to demodulate data signals or UCI signals. A UE transmits SRS to provide an eNodeB with an UL CSI. A UE transmits data information or UCI through a respective physical UL shared channel (PUSCH) or a Physical UL control channel (PUCCH). If a UE needs to transmit data information and UCI in a same UL subframe, the UE may multiplex both in a PUSCH. UCI includes Hybrid Automatic Repeat request acknowledgement (HARQ-ACK) information, indicating correct (ACK) or incorrect (NACK) detection for a data TB in a PDSCH or absence of a PDCCH detection (DTX), scheduling request (SR) indicating whether a UE has data in the UE's buffer, rank indicator (RI), and channel state information (CSI) enabling an eNodeB to perform link adaptation for PDSCH transmissions to a UE. HARQ-ACK information is also transmitted by a UE in response to a detection of a PDCCH/EPDCCH indicating a release of semi-persistently scheduled PDSCH (see also REF 3).

A UL subframe (or slot) includes two slots. Each slot includes $$N_{symb}^{UL}$$

symbols for transmitting data information, UCI, DMRS, or SRS. A frequency resource unit of an UL system BW is an RB. A UE is allocated $N_{RB}$ RBs for a total of $$N_{RB} \cdot N_{sc}^{RB}$$

REs for a transmission BW. For a PUCCH, $N_{RB}=1$. A last subframe (or slot) symbol can be used to multiplex SRS transmissions from one or more UEs. A number of subframe (or slot) symbols that are available for data/UCI/DMRS transmission is $$N_{symb} = 2 \cdot (N_{symb}^{UL} - 1) - N_{SRS},$$

where $N_{SRS}=1$ if a last subframe (or slot) symbol is used to transmit SRS and $N_{SRS}=0$ otherwise.

Figure 6:
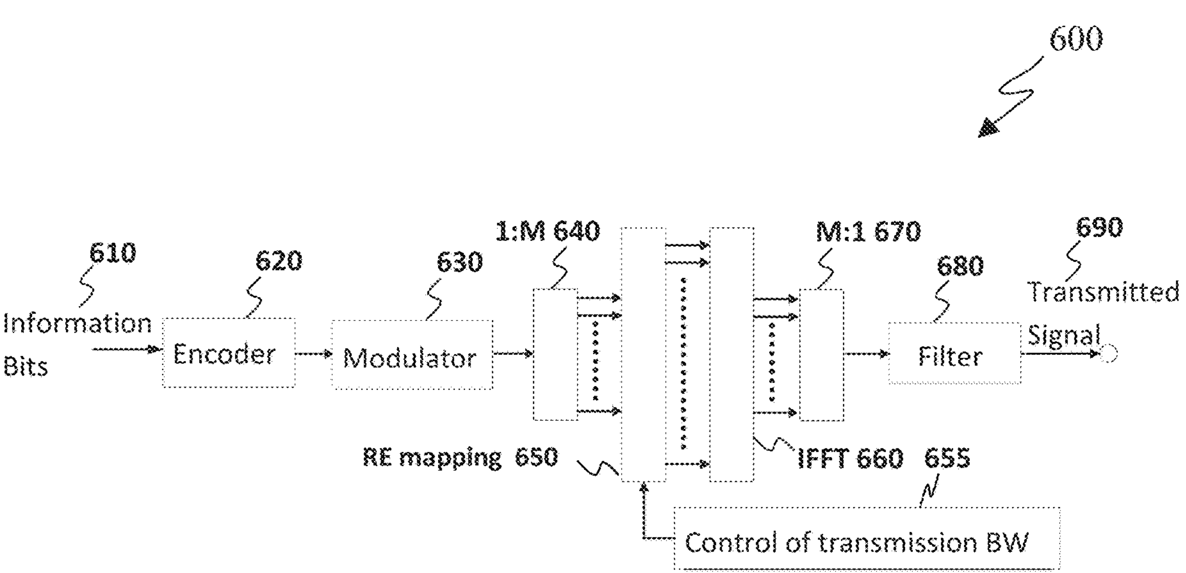
FIG. 6 illustrates a transmitter block diagram for a physical downlink shared channel (PDSCH) in a subframe according to embodiments of the present disclosure.

FIG. 6 illustrates a transmitter block diagram 600 for a PDSCH in a subframe according to embodiments of the present disclosure. The embodiment of the transmitter block diagram 600 illustrated in FIG. 6 is for illustration only. One or more of the components illustrated in FIG. 6 can be implemented in specialized circuitry configured to perform the noted functions or one or more of the components can be implemented by one or more processors executing instructions to perform the noted functions. FIG. 6 does not limit the scope of this disclosure to any particular implementation of the transmitter block diagram 600.

As shown in FIG. 6, information bits 610 are encoded by encoder 620, such as a turbo encoder, and modulated by modulator 630, for example using quadrature phase shift keying (QPSK) modulation. A serial to parallel (S/P) converter 640 generates M modulation symbols that are subsequently provided to a mapper 650 to be mapped to REs selected by a transmission BW selection unit 655 for an assigned PDSCH transmission BW, unit 660 applies an Inverse fast Fourier transform (IFFT), the output is then serialized by a parallel to serial (P/S) converter 670 to create a time domain signal, filtering is applied by filter 680, and a signal transmitted 690. Additional functionalities, such as data scrambling, cyclic prefix insertion, time windowing, interleaving, and others are well known in the art and are not shown for brevity.

Figure 7:
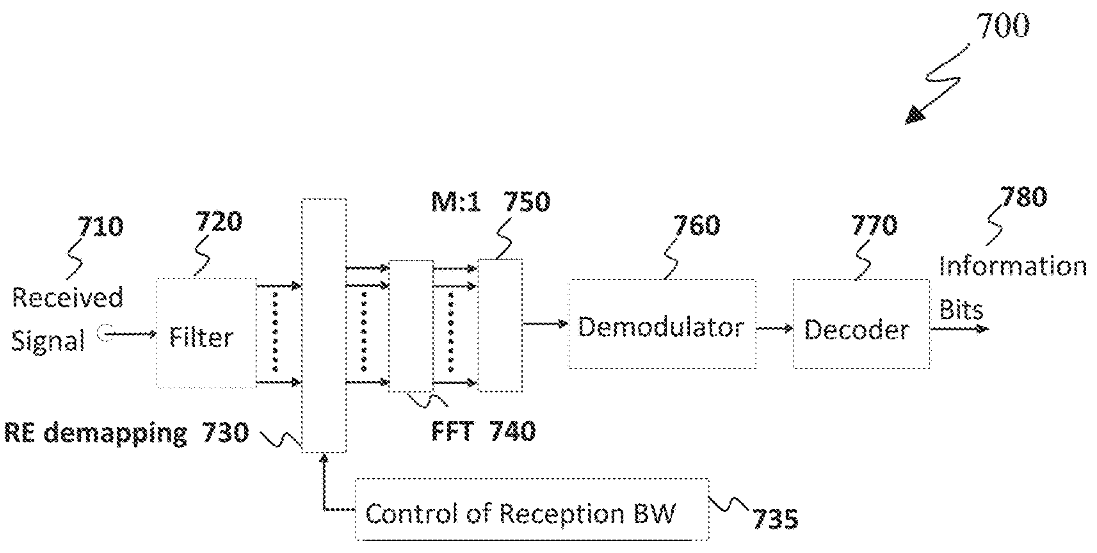
FIG. 7 illustrates a receiver block diagram for a PDSCH in a subframe according to embodiments of the present disclosure.

FIG. 7 illustrates a receiver block diagram 700 for a PDSCH in a subframe according to embodiments of the present disclosure. The embodiment of the diagram 700 illustrated in FIG. 7 is for illustration only. One or more of the components illustrated in FIG. 7 can be implemented in specialized circuitry configured to perform the noted functions or one or more of the components can be implemented by one or more processors executing instructions to perform the noted functions. FIG. 7 does not limit the scope of this disclosure to any particular implementation of the diagram 700.

As shown in FIG. 7, a received signal 710 is filtered by filter 720, REs 730 for an assigned reception BW are selected by BW selector 735, unit 740 applies a fast Fourier transform (FFT), and an output is serialized by a parallel-to-serial converter 750. Subsequently, a demodulator 760 coherently demodulates data symbols by applying a channel estimate obtained from a DMRS or a CRS (not shown), and a decoder 770, such as a turbo decoder, decodes the demodulated data to provide an estimate of the information data bits 780. Additional functionalities such as time-windowing, cyclic prefix removal, de-scrambling, channel estimation, and de-interleaving are not shown for brevity.

Figure 8:
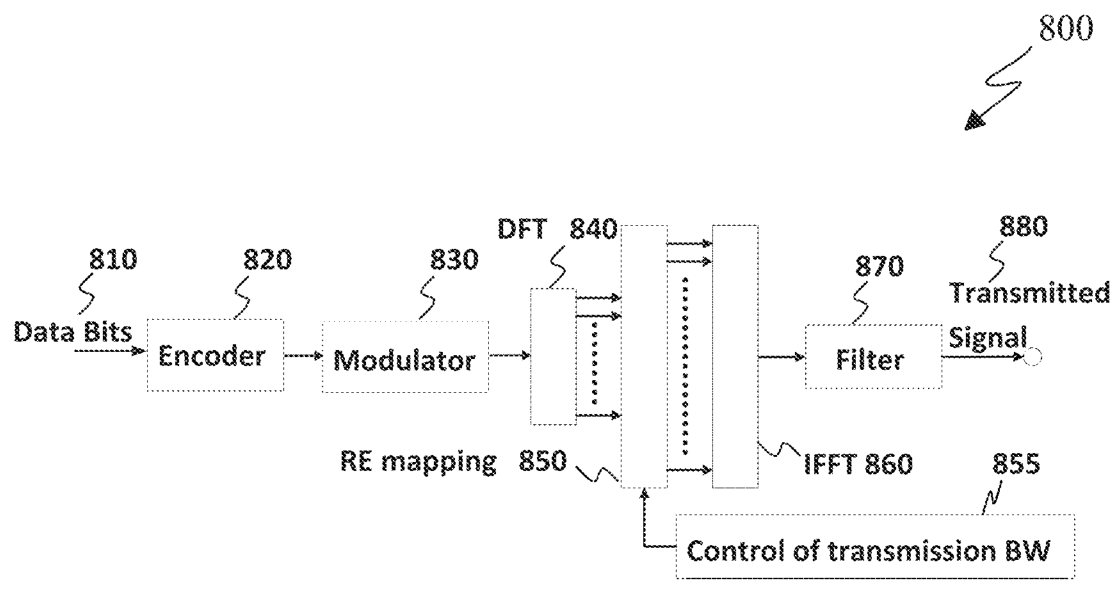
FIG. 8 illustrates a transmitter block diagram for a physical uplink shared channel (PUSCH) in a subframe according to embodiments of the present disclosure.

FIG. 8 illustrates a transmitter block diagram 800 for a PUSCH in a subframe according to embodiments of the present disclosure. One or more of the components illustrated in FIG. 7 can be implemented in specialized circuitry configured to perform the noted functions or one or more of the components can be implemented by one or more processors executing instructions to perform the noted functions. The embodiment of the block diagram 800 illustrated in FIG. 8 is for illustration only. FIG. 8 does not limit the scope of this disclosure to any particular implementation of the block diagram 800.

As shown in FIG. 8, information data bits 810 are encoded by encoder 820, such as a turbo encoder, and modulated by modulator 830. A discrete Fourier transform (DFT) unit 840 applies a DFT on the modulated data bits, REs 850 corresponding to an assigned PUSCH transmission BW are selected by transmission BW selection unit 855, unit 860 applies an IFFT and, after a cyclic prefix insertion (not shown), filtering is applied by filter 870 and a signal transmitted 880.

Figure 9:
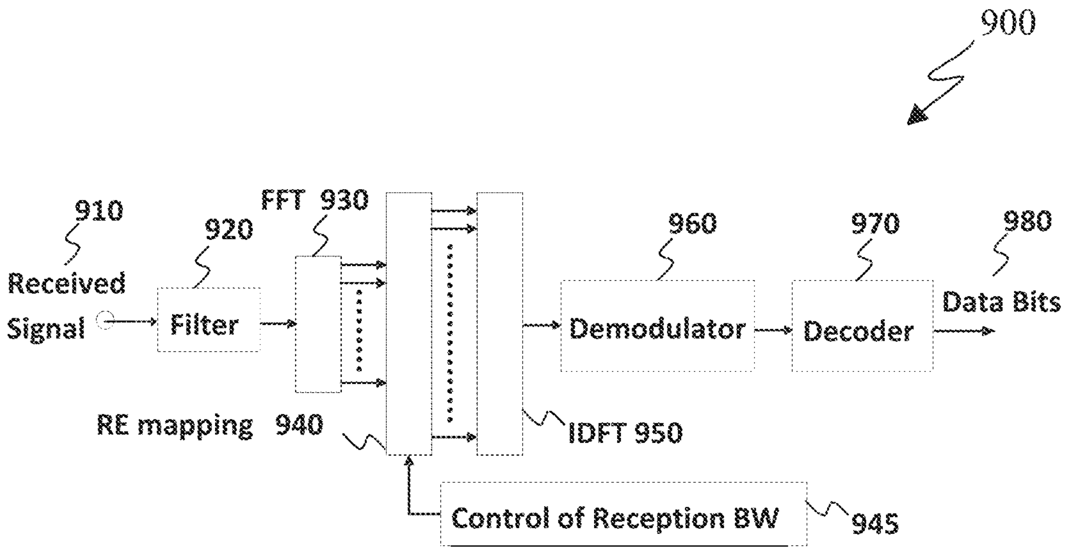
FIG. 9 illustrates a receiver block diagram for a PUSCH in a subframe according to embodiments of the present disclosure.

FIG. 9 illustrates a receiver block diagram 900 for a PUSCH in a subframe according to embodiments of the present disclosure. The embodiment of the block diagram 900 illustrated in FIG. 9 is for illustration only. One or more of the components illustrated in FIG. 9 can be implemented in specialized circuitry configured to perform the noted functions or one or more of the components can be implemented by one or more processors executing instructions to perform the noted functions. FIG. 9 does not limit the scope of this disclosure to any particular implementation of the block diagram 900.

As shown in FIG. 9, a received signal 910 is filtered by filter 920. Subsequently, after a cyclic prefix is removed (not shown), unit 930 applies an FFT, REs 940 corresponding to an assigned PUSCH reception BW are selected by a reception BW selector 945, unit 950 applies an inverse DFT (IDFT), a demodulator 960 coherently demodulates data symbols by applying a channel estimate obtained from a DMRS (not shown), a decoder 970, such as a turbo decoder, decodes the demodulated data to provide an estimate of the information data bits 980.

There are two types of frequency range (FR) defined in 3GPP 5G NR specifications. The sub-6 GHz range is called frequency range 1 (FR1) and millimeter wave range is called frequency range 2 (FR2). An example of the frequency range for FR1 and FR2 is shown below.

| Frequency range designation | Corresponding frequency range |
|---|---|
| FR1 | 450 MHz-6000 MHz |
| FR2 | 24250 MHz-52600 MHz |

For MIMO in FR1, up to 32 CSI-RS antenna ports is supported, and in FR2, up to 8 CSI-RS antenna ports is supported. In next generation cellular standards (e.g., 6G), in addition to FR1 and FR2, new carrier frequency bands can be considered, e.g., FR4 (>52.6 GHz), terahertz (>100 GHz) and upper mid-band (10-15 GHz). The number of CSI-RS ports that can be supported for these new bands is likely to be different from FR1 and FR2. In particular, for 10-15 GHz band, the max number of CSI-RS antenna ports is likely to be more than FR1, due to smaller antenna form factors, and feasibility of fully digital beamforming (as in FR1) at these frequencies. For instance, the number of CSI-RS antenna ports can grow up to 128. Besides, the NW deployment/topology at these frequencies is also expected to be denser/distributed, for example, antenna ports distributed at multiple (potentially non-co-located, hence geographically separated) TRPs within a cellular region can be the main scenario of interest, due to which the number of CSI-RS antenna ports for MIMO can be even larger (e.g., up to 256).

A (spatial or digital) precoding/beamforming can be used across these large number of antenna ports in order to achieve MIMO gains. Depending on the carrier frequency, and the feasibility of RF/HW-related components, the (spatial) precoding/beamforming can be fully digital or hybrid analog-digital. In fully digital beamforming, there can be one-to-one mapping between an antenna port and an antenna element, or a 'static/fixed' virtualization of multiple antenna elements to one antenna port can be used. Each antenna port can be digitally controlled. Hence, a spatial multiplexing across all antenna ports is possible.

Figure 10:
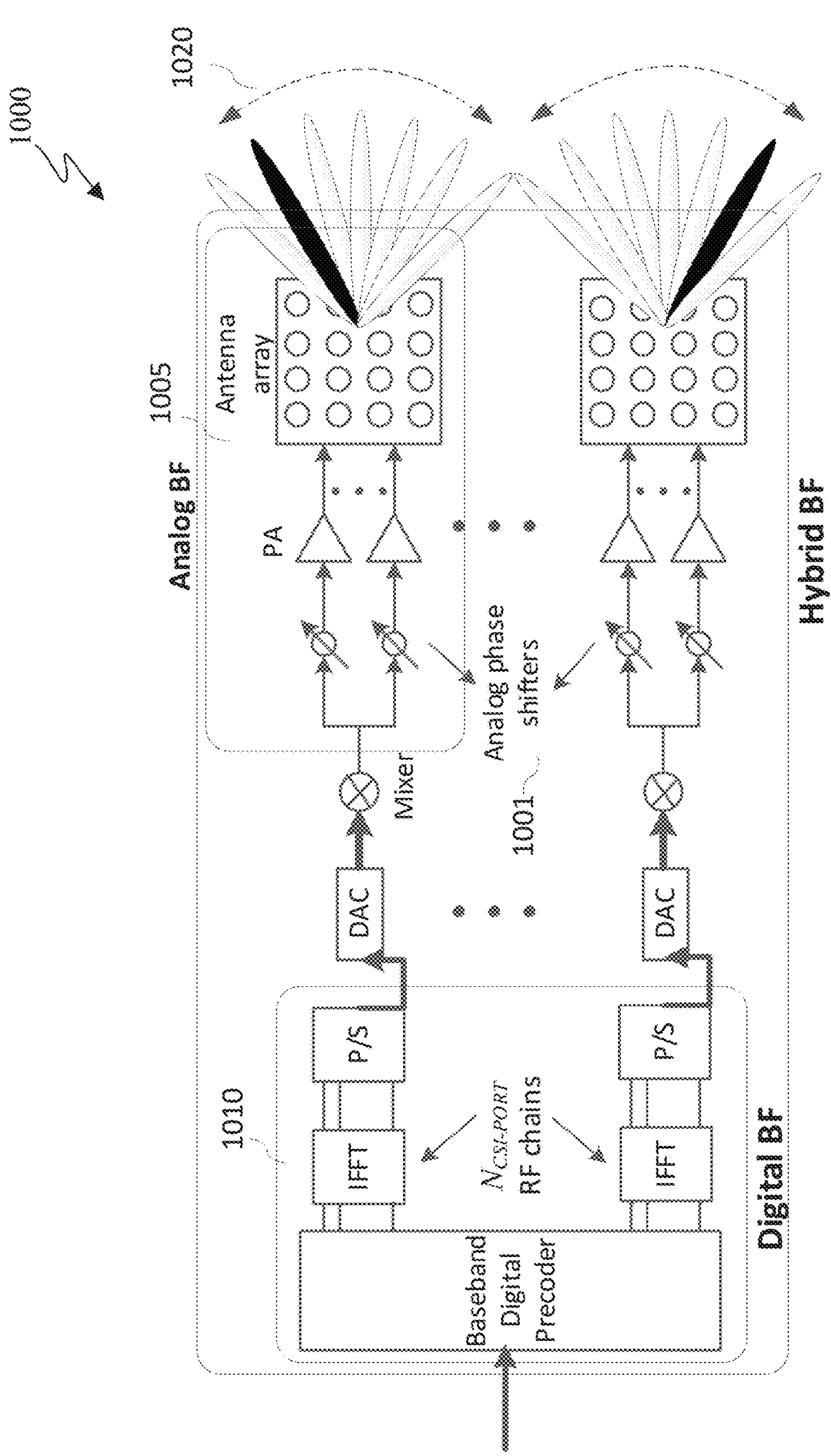
FIG. 10 illustrates an example antenna blocks or arrays forming beams according to embodiments of the present disclosure.

FIG. 10 illustrates an example antenna blocks or arrays 1000 according to embodiments of the present disclosure. The embodiment of the antenna blocks or arrays 1000 illustrated in FIG. 10 is for illustration only. FIG. 10 does not limit the scope of this disclosure to any particular implementation of the antenna blocks or arrays.

In a hybrid analog-digital beamforming, analog beamforming corresponds to a 'dynamic/varying' virtualization of multiple antenna elements to obtain one antenna port (or antenna panel). Although the number of antenna elements can be larger for a given form factor, the number of CSI-RS ports-which can correspond to the number of digitally precoded ports—tends to be limited due to hardware constraints (such as the feasibility to install a large number of ADCs/DACs at mmWave frequencies) as illustrated in FIG. 10. In this case, one CSI-RS port is mapped onto a large number of antenna elements which can be controlled by a bank of analog phase shifters 1001. One CSI-RS port can then correspond to one sub-array which produces a narrow analog beam through analog beamforming 1005. This analog beam can be configured to sweep across a wider range of angles 1020 by varying the phase shifter bank across symbols or subframes (or slots). The number of sub-arrays (equal to the number of RF chains) is the same as the number of antenna ports $N_{PORT}$. A digital beamforming unit 1010 performs a linear combination across $N_{PORT}$ analog beams to further increase precoding gain. While analog beams are wideband (hence not frequency-selective), digital precoding can be varied across frequency sub-bands or resource blocks. Receiver operation can be conceived analogously.

Figure 11:
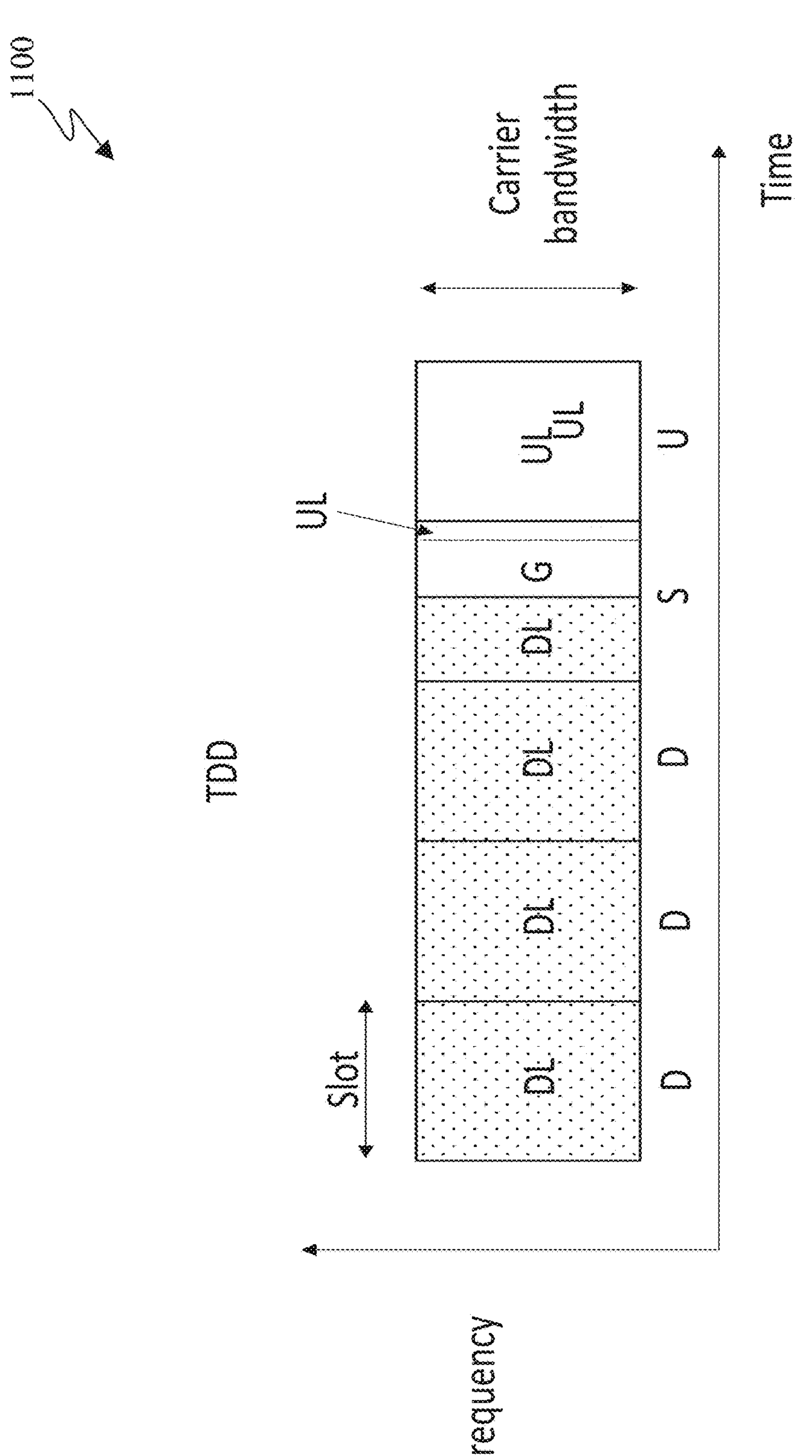
FIG. 11 illustrates an example structure of slots or single-carrier time-division duplex (TDD) uplink-downlink (UL-DL) frame configuration for a TDD communications system according to embodiments of the disclosure.

FIG. 11 illustrates an example UL-DL frame configuration in a TDD communications system 1100 according to embodiments of the disclosure. The embodiment of the UL-DL frame configuration in a TDD communications system 1100 illustrated in FIG. 11 is for illustration only. FIG. 11 does not limit the scope of this disclosure to any particular implementation of the UL-DL frame configuration in a TDD communications system 1100.

5G NR radio supports time-division duplex (TDD) operation and frequency division duplex (FDD) operation. Use of FDD or TDD depends on the NR frequency band and per-country allocations. TDD is required in most bands above 2.5 GHz. FIG. 11 illustrates an example structure of slots or single-carrier TDD UL-DL frame configuration for a TDD communications system according to the embodiments of the disclosure.

A DDDSU UL-DL configuration is shown, where D denotes a DL slot, U denotes an UL slot, and S denotes a special or switching slot with a DL part, a flexible part that can also be used as guard period G for DL-to-UL switching, and optionally an UL part.

TDD has several advantages over FDD. For example, use of the same band for DL and UL transmissions leads to simpler UE implementation with TDD because a duplexer is not required. Another advantage is that time resources can be flexibly assigned to UL and DL considering an asymmetric ratio of traffic in both directions. DL is typically assigned most time resources in TDD to handle DL-heavy mobile traffic. Another advantage is that channel state information (CSI) can be more easily acquired via channel reciprocity. This reduces an overhead associated with CSI reports especially when there are many antennas or antenna elements.

Although there are advantages of TDD over FDD, there are also disadvantages. A first disadvantage is a smaller coverage of TDD due to the usually small portion of time resources available for UL transmissions, while with FDD all time resources can be used for UL transmissions. Another disadvantage is latency. In TDD, a timing gap between DL reception and UL transmission containing the hybrid automatic repeat request acknowledgement (HARQ-ACK) information associated with DL receptions is typically larger than that in FDD, for example by several milliseconds. Therefore, the HARQ round trip time in TDD is typically longer than that with FDD, especially when the DL traffic load is high. This causes increased UL user plane latency in TDD and can cause data throughput loss or even HARQ stalling when a PUCCH providing HARQ-ACK information needs to be transmitted with repetitions to improve coverage (an alternative in such case is for a network to forgo HARQ-ACK information at least for some transport blocks in the DL).

To address some of the disadvantages for TDD operation, a dynamic adaptation of link direction has been considered where except for some symbols in some slots supporting predetermined transmissions such as for SSBs, symbols of a slot can have flexible transmission direction, e.g., DL or UL, which a UE can determine according to scheduling information for transmissions or receptions. A PDCCH can also be used to provide a DCI format, such as a DCI format 2_0, that can indicate a link direction of some flexible symbols in one or more slots. Nevertheless, in actual deployments, it is difficult for a gNB scheduler to adapt a transmission direction of symbols without coordination with other gNB schedulers in the network. This is because of cross-link interference (CLI) where, for example, DL receptions in a cell by a UE can experience large interference from UL transmissions in the same or neighboring cells from other UEs.

Full-duplex (FD) communications offer a potential for increased spectral efficiency, improved capacity, and reduced latency in wireless networks. When using FD communications, UL and DL signals are simultaneously received and transmitted on fully or partially overlapping, or adjacent, frequency resources, thereby improving spectral efficiency and reducing latency in user and/or control planes.

There are several options for operating a full-duplex wireless communication system. For example, a single carrier may be used such that transmissions and receptions are scheduled on same time-domain resources, such as symbols or slots. Transmissions and receptions on same symbols or slots may be separated in frequency, for example by being placed in non-overlapping sub-bands. An UL frequency sub-band, in time-domain resources that also include DL frequency sub-bands, may be allocated in the center of a carrier, or at the edge of the carrier, or at a selected frequency-domain position of the carrier. The allocations of DL sub-bands and UL sub-bands may partially or fully overlap. A gNB may simultaneously transmit and receive in time-domain resources using same physical antennas, antenna ports, antenna panels and transmitter-receiver units (TRX). Transmission and reception in FD may also occur using separate physical antennas, ports, panels, or TRXs. Antennas, ports, panels, or TRXs may also be partially reused, or only respective subsets can be active for transmissions and receptions when FD communication is enabled.

When a UE receives signals/channels from a gNB on a full-duplex slot or symbol, the receptions may be scheduled in a DL subband of the full-duplex slot or symbol. When full-duplex operation at the gNB uses a DL slot or symbol for scheduling transmissions from the UE using full-duplex transmission and reception at the gNB, there may be one or multiple, such as two, DL subbands on the full-duplex slot or symbol. When a UE is scheduled to transmit on a full-duplex slot or symbol, the transmission may be scheduled in an UL subband of the full-duplex slot or symbol. When full-duplex operation at the gNB uses an UL slot or symbol for purpose of scheduling transmissions to UEs using full-duplex transmission and reception at the gNB, there may be one or multiple, such as two, UL subbands in the full-duplex slot or symbol. Full-duplex operation using an UL subband or a DL subband may be referred to as Subband-Full-Duplex (SBFD).

For example, when full-duplex operation at the gNB uses a DL or F slot or symbol for scheduling transmissions from the UE using full-duplex transmission and reception at the gNB, there may be one DL subband on the full-duplex slot or symbol and one UL subband of the full-duplex slot or symbol in the NR carrier. A frequency-domain configuration of the DL and UL subbands may then be referred to as 'DU' or 'UD', respectively, depending on whether the UL subband is configured/indicated in the upper or the lower part of the NR carrier. In another example, when full-duplex operation at the gNB uses a DL or F slot or symbol for scheduling transmissions from the UE using full-duplex transmission and reception at the gNB, there may be two, DL subbands and one UL subband on the full-duplex slot or symbol. A frequency-domain configuration of the DL and UL subbands may then be referred to as 'DUD' when the UL subband is configured/indicated in a part of the NR carrier and the DL subbands are configured/indicated at the edges of the NR carrier, respectively.

In the following, for brevity, full-duplex slots/symbols and SBFD slots/symbols may be jointly referred to as SBFD slots/symbol and non-full-duplex slots/symbols and normal DL or UL slot/symbols may be referred to as non-SBFD slots/symbols.

Instead of using a single carrier, it is also possible to use different component carriers (CCs) for receptions and transmissions by a UE. For example, receptions by a UE can occur on a first CC and transmissions by the UE occur on a second CC having a small, including zero, frequency separation from the first CC.

Furthermore, a gNB can operate with full-duplex mode even when a UE still operates in half-duplex mode, such as when the UE can either transmit and receive at a same time, or the UE can also be capable for full-duplex operation.

Full-duplex transmission/reception is not limited to gNBs, TRPs, or UEs, but can also be used for other types of wireless nodes such as relay or repeater nodes.

Full duplex operation needs to overcome several challenges to be functional in actual deployments. When using overlapping frequency resources, received signals are subject to co-channel cross-link interference (CLI) and self-interference. CLI and self-interference cancellation methods include passive methods that rely on isolation between transmit and receive antennas, active methods that utilize RF or digital signal processing, and hybrid methods that use a combination of active and passive methods. Filtering and interference cancellation may be implemented in RF, baseband (BB), or in both RF and BB. While mitigating co-channel CLI may require large complexity at a receiver, it is feasible within current technological limits. Another aspect of FD operation is the mitigation of adjacent channel CLI because in several cellular band allocations, different operators have adjacent spectrum.

Throughout the present disclosure, Full-Duplex (FD) is used as a short form for a full-duplex operation in a wireless system. The terms "Cross-Division-Duplex (XDD)" and FD or SBFD can be used interchangeably used in the disclosure.

FD operation in NR can improve spectral efficiency, link robustness, capacity, and latency of UL transmissions. In an NR TDD system, UL transmissions are limited by fewer available transmission opportunities than DL receptions. For example, for NR TDD with SCS=30 kHz, DDDU (2 msec), DDDSU (2.5 msec), or DDDDDDDSUU (5 msec), the UL-DL configurations allow for an DL:UL ratio from 3:1 to 4:1. Any UL transmission can only occur in a limited number of UL slots, for example every 2, 2.5, or 5 msec, respectively.

Figure 12:
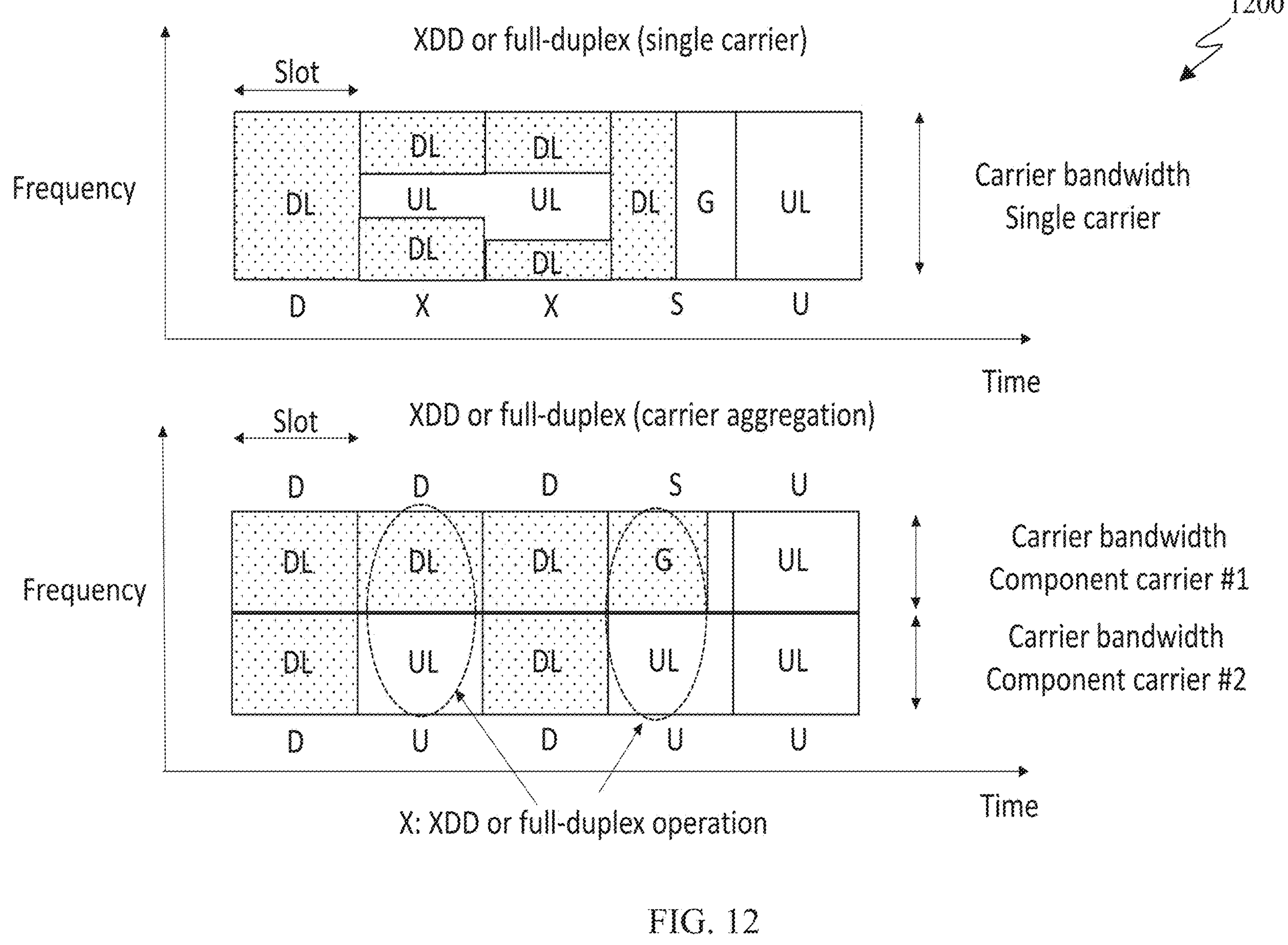
FIG. 12 illustrates example frame configurations in a full-duplex communication system according to embodiments of the disclosure.

FIG. 12 illustrates example UL-DL frame configurations in a full-duplex communications system 1200 according to embodiments of the disclosure. The embodiment of the UL-DL frame configurations in a full-duplex communications system 1200 illustrated in FIG. 12 is for illustration only. FIG. 12 does not limit the scope of this disclosure to any particular implementation of the UL-DL frame configuration in a TDD communications system 1200.

FIG. 12 illustrates two example full-duplex configurations using single- and multi-carrier UL-DL frame configurations according to embodiments of the disclosure.

For a single carrier TDD configuration with full-duplex enabled, slots denoted as X are full-duplex or XDD or SBFD slots. Both DL and UL transmissions can be scheduled in FD slots for at least one or more symbols. The term FD slot is used to refer to a slot where UEs can simultaneously both receive and transmit in at least one or more symbols of the slot if scheduled or assigned radio resources by the base station. A half-duplex UE cannot both transmit and receive simultaneously in an FD slot or on a symbol(s) of an FD slot. When a half-duplex UE is configured for transmission in symbols of an FD slot, another UE can be configured for reception in the symbols of the FD slot. A full-duplex UE can transmit and receive simultaneously in symbols of an FD slot, possibly in presence of other UEs scheduled or assigned resources for either DL or UL in the symbols of the FD slot. Transmissions by a UE in a first FD slot can use same or different frequency-domain resources than in a second FD slot, wherein the resources can differ in bandwidth, a first RB, or a location of the center carrier.

For a carrier aggregation TDD configuration with FD enabled, a UE receives in a slot on CC #1 and transmits in at least one or more symbol(s) of the slot on CC #2. In addition to D slots used only for transmissions/receptions by a gNB/UE, U slots used only for receptions/transmissions by the gNB/UE, and S slots for also supporting DL-UL switching, full-duplex slots with both transmissions/receptions by a gNB or a UE that occur on same time-domain resources, such as slots or symbols, are labeled by X. For the example of TDD with SCS=30 kHz, single carrier, and UL-DL allocation DXXSU (2.5 msec), the second and third slots allow for full-duplex or SBFD operation. UL transmissions can also occur in a last slot (U) where the full UL transmission bandwidth is available. FD or SBFD slots or symbol assignments over a period of time and/or a number of slots or symbols can be indicated by a DCI format in a PDCCH reception and can then vary per unit of the time period, or can be indicated by higher layer signaling, such as via a MAC CE or RRC.

Embodiments of the present disclosure recognize that in a wireless communication system, MIMO is often identified as an essential feature in order to achieve high system throughput requirements. One of the key components of a MIMO transmission scheme is the accurate CSI acquisition at the eNB (or gNB) (or TRP). For MU-MIMO, in particular, the availability of accurate CSI is necessary in order to guarantee high MU performance. For TDD systems, the CSI can be acquired using the SRS transmission relying on the channel reciprocity. For FDD systems, on the other hand, it can be acquired using the CSI-RS transmission from eNB (or gNB), and CSI acquisition and feedback from UE. In legacy FDD systems, the CSI feedback framework is 'implicit' in the form of CQI/PMI/RI (also CRI and LI) derived from a codebook assuming SU transmission from eNB (or gNB).

In 5G or NR systems [REF7, REF8], the above-mentioned "implicit" CSI reporting paradigm from LTE is also supported and referred to as Type I CSI reporting. In addition, a high-resolution CSI reporting, referred to as Type II CSI reporting, is also supported in Release 15 specification to provide more accurate CSI information to gNB for use cases such as high-order MU-MIMO. However, the overhead of Type II CSI reporting can be an issue in practical UE implementations. One approach to reduce Type II CSI overhead is based on frequency domain (FD) compression. In Rel. 16 NR, DFT-based FD compression of the Type II CSI has been supported (referred to as Rel. 16 enhanced Type II codebook in REF8). Some of the key components for this feature includes (a) spatial domain (SD) basis $W_1$, (b) FD basis $W_f$, and (c) coefficients $\tilde{W}_2$ that linearly combine SD and FD basis. In a non-reciprocal FDD system, a complete CSI (comprising all components) needs to be reported by the UE. However, when reciprocity or partial reciprocity does exist between UL and DL, then some of the CSI components can be obtained based on the UL channel estimated using SRS transmission from the UE. In Rel. 16 NR, the DFT-based FD compression is extended to this partial reciprocity case (referred to as Rel. 16 enhanced Type II port selection codebook in REF8), wherein the DFT-based SD basis in $W_1$ is replaced with SD CSI-RS port selection, i.e., L out of $P_{CSI-RS}/2$ CSI-RS ports are selected (the selection is common for the two antenna polarizations or two halves of the CSI-RS ports). The CSI-RS ports in this case are beamformed in SD (assuming UL-DL channel reciprocity in angular domain), and the beamforming information can be obtained at the gNB based on UL channel estimated using SRS measurements.

In Rel. 17 NR, CSI reporting has been enhanced to support the following.

- Further enhanced Type II port selection codebook: it has been known in the literature that UL-DL channel reciprocity can exist in both angular and delay domains if the UL-DL duplexing distance is small. Since delay in time domain transforms (or closely related to) basis vectors in frequency domain (FD), the Rel. 16 enhanced Type II port selection can be further extended to both angular and delay domains (or SD and FD). In particular, the DFT-based SD basis in $W_1$ and DFT-based FD basis in $W_f$ can be replaced with SD and FD port selection, i.e., L CSI-RS ports are selected in SD and/or M ports are selected in FD. The CSI-RS ports in this case are beamformed in SD (assuming UL-DL channel reciprocity in angular domain) and/or FD (assuming UL-DL channel reciprocity in delay/frequency domain), and the corresponding SD and/or FD beamforming information can be obtained at the gNB based on UL channel estimated using SRS measurements. In Rel. 17, such a codebook is supported (which is referred to as Rel. 17 further enhanced Type II port selection codebook in REF8).
- NCJT CSI reporting: When the UE can communicate with multiple TRPs that are distributed at different locations in space (e.g., within a cell), the CSI reporting can correspond to a single TRP hypothesis (i.e., CSI reporting for one of the multiple TRPs), or multi-TRP hypothesis (i.e., CSI reporting for at least two of the multiple TRPs). The CSI reporting for both single TRP and multi-TRP hypotheses are supported in Rel. 17. However, the multi-TRP CSI reporting considers a non-coherent joint transmission (NCJT), i.e., a layer (and precoder) of the transmission is restricted to be transmitted from only one TRP.

In Rel. 18 NR MIMO, the following CSI enhancements are further considered targeting two use cases (coherent joint transmission from multiple TRPs, and high/medium velocity UEs):

- Enhancements of CSI acquisition for Coherent-JT targeting FR1 and up to 4 TRPs, assuming ideal backhaul and synchronization as well as the same number of antenna ports across TRPs, as follows:
  - Rel-16/17 Type-II codebook refinement for CJT mTRP targeting FDD and its associated CSI reporting, taking into account throughput-overhead trade-off.
- CSI reporting enhancement for high/medium UE velocities by exploiting time-domain correlation/Doppler-domain information to assist DL precoding, targeting FR1, as follows:
  - Rel-16/17 Type-II codebook refinement, without modification to the spatial and frequency domain basis.
  - UE reporting of time-domain channel properties measured via CSI-RS for tracking.

Various embodiments of the present disclosure recognize that in next generation MIMO systems, the number of antenna ports is expected to increase further (e.g., up to 256), for example, for carrier frequencies in upper mid-band (10-15 GHz); the NW deployments are likely to be denser/more distributed (when compared with 5G NR); and the system is expected to work seamlessly even in challenging scenarios such as medium-high (e.g., 120 kmph) speed UEs, 'higher-order) multi-user MIMO. The CSI in such systems may need to be high resolution (higher than Type II CSI in 5G NR) while keeping the UE complexity (associated with CSI calculation) and CSI overhead (number of bits to report the CSI) still manageable (e.g., similar to that for 5G NR Type II CSI).

Various embodiments of the present disclosure recognize that another evolution path for the next generation MIMO systems is to enhance a duplex scheme toward providing full duplex capability in a given slot/symbol. For such an advanced duplex scenario, (multiple) CSI reporting with multiple hypotheses considering full duplex slot/symbol and/or non-full duplex slot/symbol can be beneficial, since it can reduce CSI reporting overhead by exploiting correlations between the multiple hypotheses.

Accordingly, various embodiments of the present disclosure provide a component for CQI(s) in a CSI report for full duplex and/or non-full duplex slot(s)/symbol(s). In particular, various embodiments of the present disclosure provide for CQI reporting based on multiple hypotheses pertaining to full duplex systems, including: (1) CQI reporting considering full duplex systems (i) common CQIs for both full/non-full duplex slot/symbol; (ii) additional CQIs/offsets for full duplex slot/symbol; (2) extension to time domain behavior (AP/SP/P CSI reporting); and (3) reporting format: separate or joint with full-duplex or non-full duplex slot/symbol.

In next generation MIMO systems, the number of antenna ports is expected to increase further (e.g., up to 256), for example, for carrier frequencies in upper mid-band (10-15 GHz); the NW deployments are likely to be denser/more distributed (when compared with 5G NR); and the system is expected to work seamlessly even in challenging scenarios such as medium-high (e.g., 120 kmph) speed UEs, 'higher-order) multi-user MIMO. The CSI in such systems may need to be high resolution (higher than Type II CSI in 5G NR) while keeping the UE complexity (associated with CSI calculation) and CSI overhead (number of bits to report the CSI) still manageable (e.g., similar to that for 5G NR Type II CSI). In the present disclosure, a high-resolution (Type II) Doppler codebook based on SD, FD< and DD compression is considered. In particular, the present disclosure considers two-part CSI or UCI framework for Type II Doppler codebook for medium/high speed scenarios and methods and apparatuses for grouping for Part 1 and Part 2 CSI and UCI omission.

All the following components and embodiments are applicable for UL transmission with CP-OFDM (cyclic prefix OFDM) waveform as well as DFT-SOFDM (DFT-spread OFDM) and SC-FDMA (single-carrier FDMA) waveforms. Furthermore, all the following components and embodiments are applicable for UL transmission when the scheduling unit in time is either one subframe (which can include one or multiple slots) or one slot.

In the present disclosure, the frequency resolution (reporting granularity) and span (reporting bandwidth) of CSI reporting can be defined in terms of frequency "subbands" and "CSI reporting band" (CRB), respectively.

A subband for CSI reporting is defined as a set of contiguous PRBs which represents the smallest frequency unit for CSI reporting. The number of PRBs in a subband can be fixed for a given value of DL system bandwidth, configured either semi-statically via higher-layer/RRC signaling, or dynamically via L1 DL control signaling or MAC control element (MAC CE). The number of PRBs in a subband can be included in CSI reporting setting.

"CSI reporting band" is defined as a set/collection of subbands, either contiguous or non-contiguous, wherein CSI reporting is performed. For example, CSI reporting band can include all the subbands within the DL system bandwidth. This can also be termed "full-band". Alternatively, CSI reporting band can include only a collection of subbands within the DL system bandwidth. This can also be termed "partial band".

The term "CSI reporting band" is used only as an example for representing a function. Other terms such as "CSI reporting subband set" or "CSI reporting bandwidth" can also be used.

In terms of UE configuration, a UE can be configured with at least one CSI reporting band. This configuration can be semi-static (via higher-layer signaling or RRC) or dynamic (via MAC CE or L1 DL control signaling). When configured with multiple (N) CSI reporting bands (e.g., via RRC signaling), a UE can report CSI associated with $n \leq N$ CSI reporting bands. For instance, >6 GHz, large system bandwidth may require multiple CSI reporting bands. The value of n can either be configured semi-statically (via higher-layer signaling or RRC) or dynamically (via MAC CE or L1 DL control signaling). Alternatively, the UE can report a recommended value of n via an UL channel.

Therefore, CSI parameter frequency granularity can be defined per CSI reporting band as follows. A CSI parameter is configured with "single" reporting for the CSI reporting band with $M_n$ subbands when one CSI parameter for all the $M_n$ subbands within the CSI reporting band. A CSI parameter is configured with "subband" for the CSI reporting band with $M_n$ subbands when one CSI parameter is reported for each of the $M_n$ subbands within the CSI reporting band.

Figure 13:
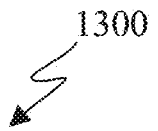
FIG. 13 illustrates an example antenna port layout and antenna group TRP according to embodiments of the present disclosure.
Figure 13:
Figure 13:
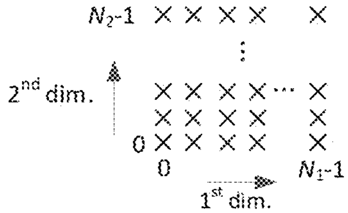
Figure 13:
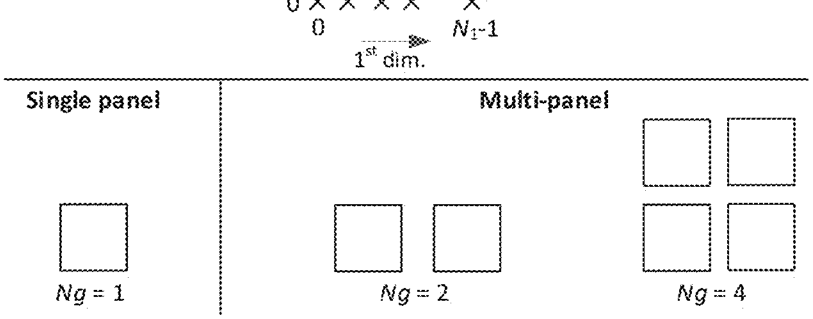

FIG. 13 illustrates an example antenna port layout and antenna group TRP 1300 according to embodiments of the present disclosure. The embodiment of the antenna port layout and antenna group TRP 1300 illustrated in FIG. 13 is for illustration only. FIG. 13 does not limit the scope of this disclosure to any particular implementation of the antenna port layout and antenna group TRP.

As illustrated in FIGS. 13, $N_1$ and $N_2$ are the number of antenna ports with the same polarization in the first and second dimensions, respectively. For 2D antenna port layouts, there are $N_1>1$, $N_2>1$, and for 1D antenna port layouts $N_1>1$ and $N_2=1$ (or $N_1=1$ and $N_2>1$). For a single-polarized (or co-polarized) antenna port layout, the total number of antenna ports is $P_{CSIRS}=N_1N_2$. And, for a dual-polarized antenna port layout, the total number of antenna ports is $P_{CSIRS}=2N_1N_2$. An illustration is shown in FIG. 13 where "X" represents two antenna polarizations. In this disclosure, the term "polarization" refers to a group of antenna ports with the same polarization. For example, antenna ports $$j = X+0, X+1, \ldots, X+\frac{P_{CSIRS}}{2}-1$$

comprise a first antenna polarization, and antenna ports $$j = X+\frac{P_{CSIRS}}{2}, X+\frac{P_{CSIRS}}{2}+1, \ldots, X+P_{CSIRS}-1$$

comprise a second antenna polarization, where $P_{CSIRS}$ is a number of CSI-RS antenna ports and X is a starting antenna port number (e.g., X=3000, then antenna ports are 3000, 3001, 3002, . . . ). Dual-polarized antenna payouts are assumed in this disclosure. The embodiments (and examples) in this disclosure however are general and are applicable to single-polarized antenna layouts as well.

Let $N_g$ be a number of antenna groups (AGs). When there are multiple antenna groups ($N_g>1$), each group ($g\in\{1, \ldots, N_g\}$) comprises dual-polarized antenna ports with $N_{1,g}$ and $N_{2,g}$ ports in two dimensions. This is illustrated in FIG. 13. Note that the antenna port layouts may be the same ($N_{1,g}=N_1$ and $N_{2,g}=N_2$) in different antenna groups, or they can be different across antenna groups. For group g, the number of antenna ports is $P_{CSIRS,g}=N_{1,g}N_{2,g}$ or $2N_{1,g}N_{2,g}$ (for co-polarized or dual-polarized respectively).

In one example, an antenna group corresponds to an antenna panel. In one example, an antenna group corresponds to a TRP. In one example, an antenna group corresponds to an RRH. In one example, an antenna group corresponds to CSI-RS antenna ports of a NZP CSI-RS resource. In one example, an antenna group corresponds to a subset of CSI-RS antenna ports of a NZP CSI-RS resource (comprising multiple antenna groups). In one example, an antenna group corresponds to CSI-RS antenna ports of multiple NZP CSI-RS resources (e.g., comprising a CSI-RS resource set).

In one example, an antenna group corresponds to a reconfigurable intelligent surface (RIS) in which the antenna group can be (re-)configured more dynamically (e.g., via MAC CE and/or DCI). For example, the number of antenna ports associated with the antenna group can be changed dynamically.

Figure 14:
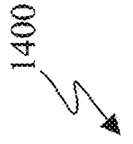
FIG. 14 illustrates co-located and distributed antenna groups (AGs) serving a moving UE according to embodiments of the present disclosure.
Figure 14:
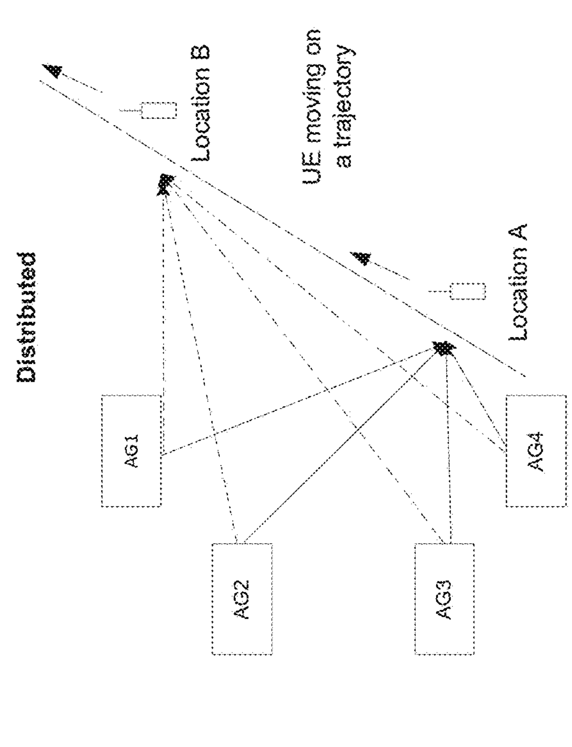
Figure 14:
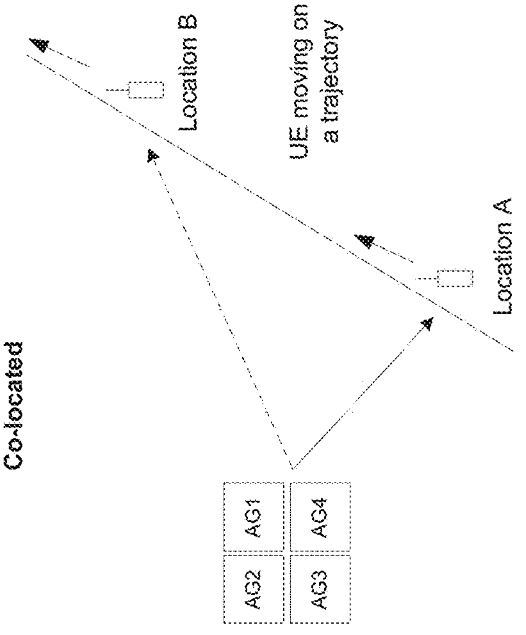

FIG. 14 illustrates co-located and distributed antenna groups (AGs) serving a moving UE 1400 according to embodiments of the present disclosure. The embodiment of the co-located and distributed antenna groups (AGs) serving a moving UE 1400 illustrated in FIG. 14 is for illustration only. FIG. 14 does not limit the scope of this disclosure to any particular implementation of the co-located and distributed antenna groups (AGs) serving a moving UE 1400.

In one example scenario, multiple AGs can be co-located or distributed, and can serve static (non-mobile) or moving UEs. An illustration of AGs serving a moving UE is shown in FIG. 14. While the UE moves from a location A to another location B, the UE measures the channel, e.g., via NZP CSI-RS resources, (may also measure the interference, e.g., via CSI-IM resources or CSI-RS resources for interference measurement), uses the measurement to determine/report CSI considering joint transmission from multiple AGs. The reported CSI can be based on a codebook. The codebook can include components considering multiple AGs, and frequency/delay-domain channel profile and time/Doppler-domain channel profile.

In one example, the antenna architecture of the MIMO system is structured. For example, the antenna structure at each AG is dual-polarized (single or multi-panel as shown in FIG. 13. The antenna structure at each AG can be the same. Or the antenna structure at an AG can be different from another AG. Likewise, the number of ports at each AG can be the same. Or the number of ports at one AG can be different from another AG.

In another example, the antenna architecture of the MIMO system is unstructured. For example, the antenna structure at one AG can be different from another AG.

Various embodiments discussed below relate to a structured antenna architecture. For simplicity, each AG is assumed to be equivalent to a panel (cf. FIG. 13), although, an AG can have multiple panels in practice. The disclosure however is not restrictive to a single panel assumption at each AG, and can easily be extended (covers) the case when an AG has multiple antenna panels.

In one embodiment, an AG constitutes (or corresponds to or is equivalent to) at least one of the following:

In one example, an AG corresponds to a TRP.

In one example, an AG corresponds to a CSI-RS resource. A UE is configured with $K=N_g>1$ non-zero-power (NZP) CSI-RS resources, and a CSI reporting is configured to be across multiple CSI-RS resources. This is similar to Class B, K>1 configuration in Rel. 14 LTE. The K NZP CSI-RS resources can belong to a CSI-RS resource set or multiple CSI-RS resource sets (e.g., K resource sets each comprising one CSI-RS resource). The details are as explained earlier in this disclosure.

In one example, an AG corresponds to a CSI-RS resource group, where a group comprises one or multiple NZP CSI-RS resources. A UE is configured with $K\geq N_g>1$ non-zero-power (NZP) CSI-RS resources, and a CSI reporting is configured to be across multiple CSI-RS resources from resource groups. This is similar to Class B, K>1 configuration in Rel. 14 LTE. The K NZP CSI-RS resources can belong to a CSI-RS resource set or multiple CSI-RS resource sets (e.g., K resource sets each comprising one CSI-RS resource). The details are as explained earlier in this disclosure. In particular, the K CSI-RS resources can be partitioned into $N_g$ resource groups. The information about the resource grouping can be provided together with the CSI-RS resource setting/configuration, or with the CSI reporting setting/configuration, or with the CSI-RS resource configuration.

In one example, an AG corresponds to a subset (or a group) of CSI-RS ports. A UE is configured with at least one NZP CSI-RS resource comprising (or associated with) CSI-RS ports that can be grouped (or partitioned) multiple subsets/groups/parts of antenna ports, each corresponding to (or constituting) an AG. The information about the subsets of ports or grouping of ports can be provided together with the CSI-RS resource setting/configuration, or with the CSI reporting setting/configuration, or with the CSI-RS resource configuration.

In one example, an AG corresponds to example A.2/3 or A.4 depending on a configuration. For example, this configuration can be explicit via a parameter (e.g., an RRC parameter). Or it can be implicit.

In one example, when implicit, it could be based on the value of K. For example, when K>1 CSI-RS resources, an AG corresponds to example A.2.2/3, and when K=1 CSI-RS resource, an AG corresponds to example A.4.

In another example, the configuration could be based on the configured codebook. For example, an AG corresponds to a CSI-RS resource (example A.2) or resource group (A.3) when the codebook corresponds to a decoupled codebook (modular or separate codebook for each AG), and an AG corresponds to a subset (or a group) of CSI-RS ports (example A.4) when codebook corresponds to a coupled (joint or coherent) codebook (one joint codebook across AGs).

In one example, when AG maps (or corresponds to) a CSI-RS resource or resource group, and a UE can select a subset of AGs (resources or resource groups) and report the CSI for the selected AGs (resources or resource groups), the selected AGs can be reported via an indicator. For example, the indicator can be a CRI or a PMI (component) or a new indicator.

In one example, when AG maps (or corresponds to) a CSI-RS port group, and a UE can select a subset of AGs (port groups) and report the CSI for the selected AGs (port groups), the selected AGs can be reported via an indicator. For example, the indicator can be a CRI or a PMI (component) or a new indicator.

In one example, when multiple (K>1) CSI-RS resources are configured for $N_g$ AGs, a decoupled (modular) codebook is used/configured, and when a single (K=1) CSI-RS resource for $N_g$ AGs, a joint codebook is used/configured.

In the following and throughout the disclosure, various embodiments of the disclosure may be also implemented in any type of UE including, for example, UEs with the same, similar, or more capabilities compared to legacy 5G NR UEs. Although various embodiments of the disclosure discuss 3GPP 5G NR communication systems, the embodiments may apply in general to UEs operating with other RATs and/or standards, such as next releases/generations of 3GPP, IEEE WiFi, and so on.

In the following, unless otherwise explicitly noted, providing a parameter value by higher layers includes providing the parameter value by a system information block (SIB), such as a SIB1, or by a common RRC signaling, or by UE-specific RRC signaling.

In the following, for brevity of description, the higher layer provided TDD UL-DL frame configuration refers to tdd-UL-DL-ConfigurationCommon as example for RRC common configuration and/or tdd-UL-DL-Configuration-Dedicated as example for UE-specific configuration. The UE determines a common TDD UL-DL frame configuration of a serving cell by receiving a SIB such as a SIB1 when accessing the cell from RRC_IDLE or by RRC signaling when the UE is configured with an SCell or additional SCGs by an IE ServingCellConfigCommon in RRC_CONNECTED. The UE determines a dedicated TDD UL-DL frame configuration using the IE ServingCellConfig when the UE is configured with a serving cell, e.g., add or modify, where the serving cell may be the SpCell or an SCell of an MCG or SCG. A TDD UL-DL frame configuration designates a slot or symbol as one of types 'D', 'U' or 'F' using at least one time-domain pattern with configurable periodicity.

In the following, for brevity of description, SFI refers to a slot format indicator as example that is indicated using higher layer provided IEs such as slotFormatCombination or slotFormatCombinationsPerCell and which is indicated to the UE by group common DCI format such as DCI F2_0 where slotFormats are defined in REF7.

In the following, for brevity of description, the parameter/IE 'fd-config' is used to describe the configuration and parameterization for UE determination of receptions and/or transmissions in a serving cell supporting full-duplex operation. For example, the UE may be provided with the set of RBs or set of symbols of an SBFD UL or DL subband. It is not necessary that the use of full-duplex operation by a gNB in the serving cell when scheduling to a UE receptions and/or transmissions in a slot or symbol is identifiable by or known to the UE. For example, parameters associated with the parameter 'fd-config' may include a set of time-domain resources, e.g., symbols/slots, where receptions or transmissions by the UE are allowed, possible, or disallowed; a range or a set of frequency-domain resources, e.g., serving cells, BWPs, start and/or end or a set of RBs, where receptions or transmissions by the UE are allowed, possible, or disallowed; one or multiple guard intervals for time and/or frequency domain radio resources during receptions or transmissions by the UE, e.g., guard SCs or RBs, guard symbols; one or multiple resource types, e.g., 'simultaneous Tx-Rx', 'Rx only', or 'Tx only' or 'D', 'U', 'F', 'N/A'; one or multiple scheduling behaviors, e.g., "DG only", "CG only", "any". Configuration and/or parameters associated with the fd-config may include indications or values to determine Tx power settings of receptions by the UE, such as, reference power, energy per resource element (EPRE), or power offset of a designated channel/or signal type transmitted by a serving gNB; to determine the power and/or spatial settings for transmissions by the UE. Configuration and/or parameters associated with the fd-config may be provided to the UE using higher layer signaling, DCI-based signaling, and/or MAC CE based signaling. For example, configuration and/or parameters associated with fd-config may be provided to the UE by means of common RRC signaling using SIB or by UE-dedicated RRC signaling such as ServingCellConfig. For example, configuration and/or parameters associated with fd-config may be provided to the UE using an RRC-configured TDRA table, or a PDCCH, PDSCH, PUCCH or PUSCH configuration, and/or DCI-based signaling that indicates to the UE a configuration for the UE to apply.

In the following, for brevity, full-duplex slots/symbols and SBFD slots/symbols may be jointly referred to as SBFD slots/symbol and non-full-duplex slots/symbols and normal DL/UL slot/symbols may be jointly referred to as non-SBFD slots/symbols or regular slots/symbols.

In one embodiment, a UE is configured with K≥1 CSI-RS resources to perform CSI reporting for regular slot(s)/symbol(s) and/or SBFD slot(s)/symbol(s).

In one example, at least one of the following examples is used to configure K≥1 CSI-RS resources for either regular slot(s)/symbol(s) or SBFD slot(s)/symbol(s).

In one example, one CSI-RS resource can be configured for CSI reporting for regular slot(s)/symbol(s).

In one example, one CSI-RS resource can be configured for CSI reporting for SBFD slot(s)/symbol(s), where the (possible) allocated frequency resources of the CSI-RS resource correspond to the PRBs for the DL of SBFD slot(s)/symbol(s). For example, for 'DUD' FD pattern of SBFD slot(s)/symbol(s), the CSI-RS resource RE mapping is done for the PRBs corresponding to a first DL part and a second DL part.

In one example, one CSI-RS resource can be configured for CSI reporting for SBFD slot(s)/symbol(s), where the (possible) allocated frequency resources of the CSI-RS resource correspond to all PRBs for the DL/UL of SBFD slot(s)/symbol(s). In one example, the UE can (may/has to) skip measuring the CSI-RS resource on the PRBs for the UL part of SBFD slot(s)/symbol(s).

In one example, (up to) two CSI-RS resources can be configured for CSI reporting for SBFD slot(s)/symbol(s), where one CSI-RS resource is configured for measuring a first DL part of SBFD slot(s)/symbol(s) and the other CSI-RS resource is configured for measuring a second DL part of SBFD slot(s)/symbols(s).

In one example, at least one of the following examples is used to configure K≥1 CSI-RS resources in a separate manner for both regular slot(s)/symbol(s) and SBFD slot(s)/symbol(s). In particular, for regular slot(s)/symbol(s), one CSI-RS resource is according to one or more examples herein, and for SBFD slot(s)/symbol(s), one or two CSI-RS resources is/are according to one or more examples herein. That is, the K≥1 CSI-RS resources are according to one or more examples herein.

In one example, at least one of the following examples is used to configure K≥1 CSI-RS resources in a joint manner for both regular slot(s)/symbol(s) and SBFD slot(s)/symbol(s).

In one example, one common CSI-RS resource can be configured for both regular slot(s)/symbol(s) and SBFD slot(s)/symbol(s).

In one example, one common CSI-RS resource can be configured for both regular slot(s)/symbol(s) and SBFD slot(s)/symbol(s), and one additional CSI-RS resource can be configured for SBFD slot(s)/symbol(s).

In one example, one common CSI-RS resource can be configured for both regular slot(s)/symbol(s) and SBFD slot(s)/symbol(s), and one additional CSI-RS resource can be configured for regular slot(s)/symbol(s).

In this disclosure, at least one example can be used/applied for CSI reporting for regular slot(s)/symbol(s) and/or SBFD slot(s)/symbol(s).

In one embodiment, a UE is configured with a CSI reporting (e.g., via higher layer CSI-ReportConfig that includes a parameter reportQuantity) that provides a content of the CSI report where the content includes CQI for up to N≥2 multiple hypotheses, e.g., N=2 two multiple hypotheses. In one example, when N=2, one hypothesis corresponds to CQI reporting for regular slot(s)/symbol(s) (e.g., DL slot(s)) and the other hypothesis corresponds to CQI reporting for SBFD slot(s)/symbol(s).

In one example, SBFD slot(s) described in this disclosure can be replaced by SBFD symbol(s).

In one example, SBFD slot(s) described in this disclosure can be replaced by SBFD slot(s)/symbol(s).

In one example, regular slot(s) described in this disclosure can be replaced by regular symbol(s).

In one example, regular slot(s) described in this disclosure can be replaced by regular slot(s)/symbol(s).

In one example, multiple hypotheses reporting can be under another name/terminology, such as multiple CSI reporting, multi-CSI reporting, two-hypothesis reporting, CSI-ReportingForSBFD, etc.

In one example, one of the N hypotheses can be configured by NW, via higher-layer signaling, MAC-CE, or DCI signaling.

In one example, a subset of the N hypotheses can be configured by NW, via higher-layer signaling, MAC-CE, or DCI signaling.

In one example, all of the N hypotheses can be configured by NW, via higher-layer signaling, MAC-CE, or DCI signaling.

In one example, one of the N hypotheses is selected by the UE and the UE reports the selected hypothesis using an indicator in CSI part 1 and reports CQI(s) corresponding to the selected hypothesis in CSI part 2.

In one example, a subset of the N hypotheses is selected by the UE and the UE reports the selected hypotheses using an indicator in CSI part 1 and reports CQI(s) corresponding to the selected hypotheses in CSI part 2.

In one example, the UE reports CQI(s) corresponding to all of the (configured) hypotheses in CSI part 1.

In one example, when one hypothesis for regular slot(s) is used/selected/configured, the CQI(s) reporting in a CSI report can be according to at least one of the examples herein.

In one example, when one hypothesis for SBFD slot(s) is used/selected/configured, the CQI(s) reporting in a CSI report can be according to at least one of the examples herein.

In one example, when both hypotheses for regular slot(s) and SBFD slot(s) are used/selected/configured, the CQI(s) reporting in a CSI report can be according to at least one of the examples herein.

In one example, at least one of the following examples is used/configured regarding the FD granularity of the CQI reporting across SBs (within the CSI reporting band) for regular slot(s).

In one example, the FD granularity is wideband (WB), i.e., one CQI value is reported for the entire CSI reporting band or for all SBs in the CSI reporting band for regular slot(s).

In one example, the FD granularity is SB, i.e., one CQI value is reported for each SB in the CSI reporting for regular slot(s).

In one example, the FD granularity is WB+SB (differential reporting) or SB with respect to a WB reference value. That is, one WB CQI value is reported, and one differential SB CQI value is reported for each SB in the CSI reporting for regular slot(s), where each differential CQI value is with respect to the WB CQI value.

In one example, the FD granularity is fixed. In one example, one of the above examples is configured via higher layer parameter cqiFormatIndicator. In one example, cqiFormatIndicator takes a value from {WB, SB}, where WB corresponds to one or more examples herein and SB corresponds to one or more examples herein.

In one example, the FD granularity is reported by the UE. This reporting can be via UE capability reporting, wherein the UE reports the one or multiple FD granularities that it supports (when configured, the FD granularity is configured subject to the UE capability reporting). Or this reporting can be via a CSI report (either separate or together with another CSI report). In this case, a two-part UCI can be used and an information about the FD granularity is included in UCI part 1.

In one example, the number of CQIs across FD SBs for regular slot(s) (denote as $X_{regular}$) is configured. When $X_{regular}=1$, the CQI across SBs is according to one or more examples herein. When $X_{regular}>1$, the CQI across SBs is according to one or more examples herein.

In one example, at least one of the following examples is used/configured regarding the FD granularity of the CQI reporting across SBs (within the CSI reporting band) for SBFD slot(s).

In one example, the FD granularity is wideband (WB), i.e., one CQI value is reported for the entire CSI reporting band or for all SBs in the CSI reporting band for SBFD slot(s). For example, regardless of FD patterns on SBFD slot(s), (e.g., DUD or DU, UD), one CQI value is reported.

In one example, the FD granularity is SB, i.e., one CQI value is reported for each SB in the CSI reporting band for SBFD slot(s). For example, regardless of FD patterns on SBFD slot(s), (e.g., DUD or DU, UD), one CQI value for each SB is reported. In one example, the considered SBs for the CQI reporting correspond to the SBs for DL (i.e., not including the SBs for UL) on SBFD slot(s).

In one example, the FD granularity is WB+SB (differential reporting) or SB with respect to a WB reference value. That is, one WB CQI value is reported, and one differential SB CQI value is reported for each SB in the CSI reporting for SBFD slot(s), where each differential CQI value is with respect to the WB CQI value. For example, regardless of FD patterns on SBFD slot(s), (e.g., DUD or DU, UD), one WB CQI value is reported, and one differential SB CQI value is reported for each SB in the CSI reporting for SBFD slot(s). In one example, the considered SBs for the CQI reporting correspond to the SBs for DL (i.e., not including the SBs for UL) on SBFD slot(s).

In one example, two WB CQI values are reported for SBFD slot(s), where one WB CQI value is reported for a first part of the CSI reporting band for the SBFD slot(s), and the other WB CQI value is reported for a second part of the CSI reporting band for the SBFD slot(s). For example, a 'DUD' FD pattern is configured for CSI reporting for SBFD slot(s), the first part of the CSI reporting band corresponds to the first DL part (e.g., 'DUD') and the second part of the CSI reporting band corresponds to the second DL part (e.g., 'DUD').

In one example, one WB CQI value is reported for a first part of the CSI reporting band for SBFD slot(s), and one CQI value is reported for each SB in a second part of the CSI reporting band for the SBFD slot(s). For example, a 'DUD' FD pattern is configured for CSI reporting for SBFD slot(s), the first part of the CSI reporting band corresponds to the first DL part (e.g., 'DUD') and the second part of the CSI reporting band corresponds to the second DL part (e.g., 'DUD').

In one example, one WB CQI value is reported for a first part of the CSI reporting band for SBFD slot(s), and WB+SB (differential reporting) CQI values are reported for a second part of the CSI reporting band for the SBFD slot(s). That is, one WB CQI value is reported, and one differential SB CQI value is reported for each SB in the second part of the CSI reporting for SBFD slot(s), where each differential CQI value is with respect to the WB CQI value. For example, a 'DUD' FD pattern is configured for CSI reporting for SBFD slot(s), the first part of the CSI reporting band corresponds to the first DL part (e.g., 'DUD') and the second part of the CSI reporting band corresponds to the second DL part (e.g., 'DUD').

In one example, one CQI value is reported for each SB in a first part of the CSI reporting band for SBFD slot(s), and WB+SB (differential reporting) CQI values are reported for a second part of the CSI reporting band for the SBFD slot(s). That is, one WB CQI value is reported, and one differential SB CQI value is reported for each SB in the second part of the CSI reporting for SBFD slot(s), where each differential CQI value is with respect to the WB CQI value. For example, a 'DUD' FD pattern is configured for CSI reporting for SBFD slot(s), the first part of the CSI reporting band corresponds to the first DL part (e.g., 'DUD') and the second part of the CSI reporting band corresponds to the second DL part (e.g., 'DUD').

In one example, WB+SB (differential reporting) CQI values are reported for a first part of the CSI reporting band for SBFD slot(s), and WB+SB (differential reporting) CQI values are reported for a second part of the CSI reporting band for the SBFD slot(s). That is, for each part, one WB CQI value is reported, and one differential SB CQI value is reported for each SB where each differential CQI value is with respect to the WB CQI value. For example, a 'DUD' FD pattern is configured for CSI reporting for SBFD slot(s), the first part of the CSI reporting band corresponds to the first DL part (e.g., 'DUD') and the second part of the CSI reporting band corresponds to the second DL part (e.g., 'DUD').

In one example, the FD granularity for SBFD slot(s) is fixed. In one example, one of the above examples is configured via higher layer parameter cqiFormatIndicator or a new indicator such as cqiFormatIndicatorSBFD. In one example, cqiFormatIndicator or cqiFormatIndicatorSBFD takes a value from 3 bit values, where '000', '001', . . . , '111' correspond to one or more examples herein.

In one example, the FD granularity for SBFD slot(s) is reported by the UE. This reporting can be via UE capability reporting, wherein the UE reports the one or multiple FD granularities that it supports (when configured, the FD granularity for SBFD slot(s) is configured subject to the UE capability reporting). Or this reporting can be via a CSI report (either separate or together with another CSI report). In this case, a two-part UCI can be used and an information about the FD granularity is included in UCI part 1.

In one example, the number of CQIs across FD SBs for SBFD slot(s) (denote as $X_{SBFD}$) is configured. When $X_{SBFD}=2$, the CQI across SBs is according to one or more examples herein. When $X_{SBFD}>2$, the CQIs across SBs are according to one or more examples herein.

In one example, at least one of the following examples is used/configured regarding the FD granularity of CQI reporting across SBs (within the CSI reporting band) for regular slot(s) and the FD granularity of CQI reporting across SBs (within the CSI reporting band) for SBFD slot(s).

In one example, the CQI reporting for regular slot(s) and SBFD slot(s) is separate. In particular, the FD granularity of the CQI reporting for regular slot(s) is according to one or more examples herein, and the FD granularity of the CQI reporting for SBFD slot(s) is according to one or more examples herein. That is, the FD granularities are according to one or more examples herein.

- When (a,b)=(1,1), one WB CQI value is reported for regular slot(s) and one WB CQI value is reported for SBFD slot(s) (total 2 CQIs).
- When (a,b)=(1,2), one WB CQI value is reported for regular slot(s) and one CQI value is reported for each SB for SBFD slot(s).
- When (a,b)=(1,3), one WB CQI value is reported for regular slot(s) and $(1+N_{SB,SBFD})$ CQI values are reported for SBFD slot(s), where $N_{SB,SBFD}$ is the number of SBs for SBFD slot(s). For each SB for SBFD slot(s), one value is a reference and SB CQI with respect to the reference is reported.

When (a,b)=(1,4), one WB CQI value is reported for regular slot(s) and two WB CQI values are reported for SBFD slot(s) (total 3 CQIs).

When (a,b)=(1,5), one WB CQI value is reported for regular slot(s) and ($1+N_{SB,SBFD1}$) or ($1+N_{SB,SBFD2}$) CQI values are reported for SBFD slot(s), where $N_{SB,SBFD1}$ (or $N_{SB,SBFD2}$) is the number of SBs for a first part (or a second part) of the CSI reporting band for SBFD slot(s).

When (a,b)=(1,6), one WB CQI value is reported for regular slot(s) and ($2+N_{SB,SBFD1}$) or ($2+N_{SB,SBFD2}$) CQI values are reported for SBFD slot(s), where $N_{SB,SBFD1}$ (or $N_{SB,SBFD2}$) is the number of SBs for a first part (or a second part) of the CSI reporting band for SBFD slot(s).

When (a,b)=(1,7), one WB CQI value is reported for regular slot(s) and ($1+N_{SB,SBFD}$) CQI values are reported for SBFD slot(s), where $N_{SB,SBFD}$ is the number of SBs for SBFD slot(s), i.e., $N_{SB,SBFD}=N_{SB,SBFD1}+N_{SB,SBFD2}$.

When (a,b)=(1,8), one WB CQI value is reported for regular slot(s) and ($2+N_{SB,SBFD}$) CQI values are reported for SBFD slot(s), where $N_{SB,SBFD}$ is the number of SBs for SBFD slot(s), i.e., $N_{SB,SBFD}=N_{SB,SBFD1}+N_{SB,SBFD2}$.

When (a,b)=(2,1), one CQI value is reported for each SB for regular slot(s) and one WB CQI value is reported for SBFD slot(s) (total 2 CQIs).

When (a,b)=(2,2), one CQI value is reported for each SB for regular slot(s) and one CQI value is reported for each SB for SBFD slot(s).

When (a,b)=(2,3), one CQI value is reported for each SB for regular slot(s) and ($1+N_{SB,SBFD}$) CQI values are reported for SBFD slot(s), where $N_{SB,SBFD}$ is the number of SBs for SBFD slot(s). For each SB for SBFD slot(s), one value is a reference and SB CQI with respect to the reference is reported.

When (a,b)=(2,4), one CQI value is reported for each SB for regular slot(s) and two WB CQI values are reported for SBFD slot(s) (total 3 CQIs).

When (a,b)=(2,5), one CQI value is reported for each SB for regular slot(s) and ($1+N_{SB,SBFD1}$) or ($1+N_{SB,SBFD2}$) CQI values are reported for SBFD slot(s), where $N_{SB,SBFD1}$ (or $N_{SB,SBFD2}$) is the number of SBs for a first part (or a second part) of the CSI reporting band for SBFD slot(s).

When (a,b)=(2,6), one CQI value is reported for each SB for regular slot(s) and ($2+N_{SB,SBFD1}$) or ($2+N_{SB,SBFD2}$) CQI values are reported for SBFD slot(s), where $N_{SB,SBFD1}$ (or $N_{SB,SBFD2}$) is the number of SBs for a first part (or a second part) of the CSI reporting band for SBFD slot(s).

When (a,b)=(2,7), one CQI value is reported for each SB for regular slot(s) and ($1+N_{SB,SBFD}$) CQI values are reported for SBFD slot(s), where $N_{SB,SBFD}$ is the number of SBs for SBFD slot(s), i.e., $N_{SB,SBFD}=N_{SB,SBFD1}+N_{SB,SBFD2}$.

When (a,b)=(2,8), one CQI value is reported for each SB for regular slot(s) and ($2+N_{SB,SBFD}$) CQI values are reported for SBFD slot(s), where $N_{SB,SBFD}$ is the number of SBs for SBFD slot(s), i.e., $N_{SB,SBFD}=N_{SB,SBFD1}+N_{SB,SBFD2}$.

When (a,b)=(3,1), ($1+N_{SB,regular}$) CQI values are reported for regular slot(s) and one WB CQI value is reported for SBFD slot(s) (total 2 CQIs), where $N_{SB,regular}$ is the number of SBs for regular slot(s).

When (a,b)=(3,2), ($1+N_{SB,regular}$) CQI values are reported for regular slot(s) and one CQI value is reported for each SB for SBFD slot(s).

When (a,b)=(3,3), ($1+N_{SB,regular}$) CQI values are reported for regular slot(s) and ($1+N_{SB,SBFD}$) CQI values are reported for SBFD slot(s), where $N_{SB,SBFD}$ is the number of SBs for SBFD slot(s). For each SB for SBFD slot(s), one value is a reference and SB CQI with respect to the reference is reported.

When (a,b)=(3,4), ($1+N_{SB,regular}$) CQI values are reported for regular slot(s) and two WB CQI values are reported for SBFD slot(s) (total 3 CQIs).

When (a,b)=(3,5), ($1+N_{SB,regular}$) CQI values are reported for regular slot(s) and ($1+N_{SB,SBFD1}$) or ($1+N_{SB,SBFD2}$) CQI values are reported for SBFD slot(s), where $N_{SB,SBFD1}$ (or $N_{SB,SBFD2}$) is the number of SBs for a first part (or a second part) of the CSI reporting band for SBFD slot(s).

When (a,b)=(3,6), ($1+N_{SB,regular}$) CQI values are reported for regular slot(s) and ($2+N_{SB,SBFD1}$) or ($2+N_{SB,SBFD2}$) CQI values are reported for SBFD slot(s), where $N_{SB,SBFD1}$ (or $N_{SB,SBFD2}$) is the number of SBs for a first part (or a second part) of the CSI reporting band for SBFD slot(s).

When (a,b)=(3,7), ($1+N_{SB,regular}$) CQI values are reported for regular slot(s) and ($1+N_{SB,SBFD}$) CQI values are reported for SBFD slot(s), where $N_{SB,SBFD}$ is the number of SBs for SBFD slot(s), i.e., $N_{SB,SBFD}=N_{SB,SBFD1}+N_{SB,SBFD2}$.

When (a,b)=(3,8), ($1+N_{SB,regular}$) CQI values are reported for regular slot(s) and ($2+N_{SB,SBFD}$) CQI values are reported for SBFD slot(s), where $N_{SB,SBFD}$ is the number of SBs for SBFD slot(s), i.e., $N_{SB,SBFD}=N_{SB,SBFD1}+N_{SB,SBFD2}$.

In one or more examples herein, FD granularities for regular slot(s) and SBFD slot(s) are fixed.

In one or more examples herein, FD granularity for regular slot(s) is fixed and FD granularity for SBFD slot(s) is configured, for example, for regular slot(s), and is configured for SBFD slot(s) via, e.g., qiFormatIndicatorSBFD.

In one or more examples herein, FD granularity for regular slot(s) is configured and FD granularity for SBFD slot(s) is fixed, for example, for SBFD slot(s), and is configured for regular slot(s) via, e.g., cqiFormatIndicator.

In one example, FD granularities for regular slot(s) and SBFD slot(s) are configured. In one example, the configuration is via two separate higher layer parameters, namely cqiFormatIndicator for regular slot(s) and cqiFormatIndicatorSBFD for SBFD slot(s). In one example, this configuration is via a joint parameter, e.g., namely cqiFormatIndicator indicating one pair of values (x,y), x for regular slot(s) and y for SBFD slot(s).

In one example, one or both of FD granularities for regular slot(s) and SBFD slot(s) are reported by the UE. This reporting can be via UE capability reporting, wherein the UE reports the one or multiple FD granularities for regular slot(s) and SBFD slot(s) that it supports (when configured, the FD granularities for regular slot(s) and SBFD slot(s) are configured subject to the UE capability reporting). Or this reporting can be via a CSI report (either separate or together with another CSI report). In this case, a two-part UCI can be used and an information about the FD granularities for regular slot(s) and SBFD slot(s) is included in UCI part 1.

In one example, the number of CQIs across FD SBs for regular slot(s) (denote as $X_{FD,regular}$) is configured. When $X_{FD,regular}=1$, the CQI across FD SBs for regular slot(s) is according to one or more examples herein. When $X_{FD,regular}>1$, the CQI across FD SBs is according to one or more examples herein. In one example, the number of CQIs across FD SBs for SBFD slot(s) (denote as $X_{FD,SBFD}$) is configured. When $X_{FD,SBFD}=1$, the CQI across FD SBs for SBFD slot(s) is according to one or more examples herein. When $X_{FD,SBFD}>1$, the CQI across FD SBs for SBFD slot(s) is according to one or more examples herein.

In one example, the CQI reporting for regular slot(s) and SBFD slot(s) is joint, and at least one of the following examples correspond to the joint CQI reporting.

In one example, one WB CQI value is reported for both regular slot(s) and SBFD slot(s) (WB-CQI-common), i.e., the total number of CQIs is 1.

In one example, one SB CQI value is reported for each SB of the CSI reporting band for regular slot(s), and the SB CQIs are also applicable to SBFD slot(s) (for overlapping SBs between regular and SBFD slots) (i.e., SB-CQI-common), i.e., the total number of CQIs is $N_{SB,regular}$.

In one example, one SB CQI value is reported for each SB of the CSI reporting band for regular slot(s), and offset values for SBs that are near the discontinuities between DL and UL for SBFD slot(s) are further reported. Each offset value is determined with respect to the SB CQI value for the corresponding SB. For example, if 'DUD' FD pattern is considered for the SBFD slot(s), there are two discontinuities between DL and UL. For each of the two discontinuities, Y SBs that are near the discontinuity are the SBs for which offset values are further reported. In one example, Y=1. In another example, Y=2 or other value. In one example, Y is fixed/predetermined, or configured by NW or determined and reported by the UE. In one example, each offset value is selected/indicated via 1-bit or two-bit indicator or three-bit indicator.

In one example, one SB CQI value is reported for each SB of the CSI reporting band for regular slot(s), and one offset value for each SB of the CSI reporting band for SBFD slot(s) is further reported. Each offset value is determined with respect to the SB CQI value for the corresponding SB. In one example, each offset value is selected/indicated via 1-bit or two-bit indicator or three-bit indicator.

In one example, one SB CQI value is reported for each SB of the CSI reporting band for SBFD slot(s), and the SB CQIs are also applicable to regular slot(s) (for overlapping SBs between regular and SBFD slots) (i.e., SB-CQI-common), i.e., the total number of CQIs is $N_{SB,SBFD}$. In one example, the missing SB part for CQI reporting for the regular slot(s) is handled by gNB implementation.

In one example, one SB CQI value is reported for each SB of the CSI reporting band for SBFD slot(s), and the SB CQIs are also applicable to regular slot(s) (for overlapping SBs between regular and SBFD slots) (i.e., SB-CQI-common), and one SB CQI value is reported for each of the missing (remaining) SBs for the regular slot(s). In this case, the total number of CQIs is $N_{SB,regular}$.

In one example, one SB CQI value is reported for each SB of the CSI reporting band for SBFD slot(s), and one offset value for each of the overlapping SBs between regular slot(s) and SBFD slot(s) is further reported for the regular slot(s). Each offset value is determined with respect to the SB CQI value for the corresponding SB. In one example, each offset value is selected/indicated via 1-bit or two-bit indicator or three-bit indicator. In one example, the missing SB part for CQI reporting for the regular slot(s) is handled by gNB implementation.

In one example, one SB CQI value is reported for each SB of the CSI reporting band for SBFD slot(s), and one offset value for each of the overlapping SBs between regular slot(s) and SBFD slot(s) is further reported for the regular slot(s), and one SB CQI value is reported for each of the missing (remaining) SBs for the regular slot(s). Each offset value is determined with respect to the SB CQI value for the corresponding SB. In one example, each offset value is selected/indicated via 1-bit or two-bit indicator or three-bit indicator.

In one example, one SB CQI value is reported for each SB of the CSI reporting band for SBFD slot(s), and offset values for SBs that are near the discontinuities between DL and UL for SBFD slot(s) are further reported for the regular slot(s). Each offset value is determined with respect to the SB CQI value for the corresponding SB. For example, if 'DUD' FD pattern is considered for the SBFD slot(s), there are two discontinuities between DL and UL. For each of the two discontinuities, Y SBs that are near the discontinuity are the SBs for which offset values are further reported. In one example, Y=1. In another example, Y=2 or other value. In one example, Y is fixed/predetermined, or configured by NW or determined and reported by the UE. In one example, each offset value is selected/indicated via 1-bit or two-bit indicator or three-bit indicator. In one example, the missing SB part for CQI reporting for the regular slot(s) is handled by gNB implementation.

In one example, one SB CQI value is reported for each SB of the CSI reporting band for SBFD slot(s), and offset values for SBs that are near the discontinuities between DL and UL for SBFD slot(s) are further reported for the regular slot(s), and one SB CQI value is reported for each of the missing (remaining) SBs for the regular slot(s). Each offset value is determined with respect to the SB CQI value for the corresponding SB. For example, if 'DUD' FD pattern is considered for the SBFD slot(s), there are two discontinuities between DL and UL. For each of the two discontinuities, Y SBs that are near the discontinuity are the SBs for which offset values are further reported. In one example, Y=1. In another example, Y=2 or other value. In one example, Y is fixed/predetermined, or configured by NW or determined and reported by the UE. In one example, each offset value is selected/indicated via 1-bit or two-bit indicator or three-bit indicator.

In one example, one WB CQI is reported for both regular slot(s) and SBFD slot(s) (i.e., WB-CQI common), and one differential SB CQI (with respect to the WB CQI) is reported for each SB of the CSI reporting band for the regular slot(s). The (WB+)SB CQIs are also applicable to SBFD slot(s) (for overlapping SBs between regular and SBFD slots) (i.e., SB-CQI-common), i.e., the total number of CQIs is $1+N_{SB,regular}$.

In one example, one WB CQI is reported for both regular slot(s) and SBFD slot(s) (i.e., WB-CQI common), and one differential SB CQI (with respect to the WB CQI) is reported for each SB of the CSI reporting band for the regular slot(s). The (WB+)SB CQIs are also applicable to SBFD slot(s) (for overlapping SBs between regular and SBFD slots) (i.e., SB-CQI-common) except SBs that are near the discontinuities between DL and UL for SBFD slot(s). For example, if 'DUD' FD pattern is considered for the SBFD slot(s), there are two discontinuities between DL and UL. For each of the two discontinuities, Y SBs that are near the discontinuity are the SBs for which SB CQIs (with respect to the WB CQI) are further reported. In one example, Y=1. In another example, Y=2 or other value. In one example, Y is fixed/predetermined, or configured by NW or determined and reported by the UE. In this example, the total number of CQIs is $1+Y+N_{SB,regular}$ (for 'UD' or 'DU' FD patterns) or $1+2Y+N_{SB,regular}$ (for 'DUD' FD pattern).

In one example, one WB CQI is reported for both regular slot(s) and SBFD slot(s) (i.e., WB-CQI common), and one differential SB CQI (with respect to the WB CQI) is reported for each SB of the CSI reporting band for the regular slot(s), and one differential SB CQI (with respect to the WB CQI) is reported for each SB of the CSI reporting band for the SBFD slot(s). In this example, the total number of CQIs is $1+N_{SB,regular}+N_{SB,SBFD}$.

In one example, one WB CQI is reported for both regular slot(s) and SBFD slot(s) (i.e., WB-CQI common), and one differential SB CQI (with respect to the WB CQI) is reported for each SB of the CSI reporting band for the regular slot(s). The (WB+)SB CQIs are also applicable to SBFD slot(s) (for overlapping SBs between regular and SBFD slots) (i.e., SB-CQI-common) except SBs that are near the discontinuities between DL and UL for SBFD slot(s). For example, if 'DUD' FD pattern is considered for the SBFD slot(s), there are two discontinuities between DL and UL. For each of the two discontinuities, Y SBs that are near the discontinuity are the SBs for which offset values are further reported. Each offset value is determined with respect to the (WB+SB) CQI value for the corresponding SB. In one example, Y=1. In another example, Y=2 or other value. In one example, Y is fixed/predetermined, or configured by NW or determined and reported by the UE. In one example, each offset value is selected/indicated via 1-bit or two-bit indicator or three-bit indicator. In this example, the total number of CQIs is $1+Y+N_{SB,regular}$ (for 'UD' or 'DU' FD patterns) or $1+2Y+N_{SB,regular}$ (for 'DUD' FD pattern). Here, 1 is the number of WB CQI, $N_{SB,regular}$ is the number of SB CQIs, and Y or 2Y is the number of offset values.

In one example, one WB CQI is reported for both regular slot(s) and SBFD slot(s) (i.e., WB-CQI common), and one differential SB CQI (with respect to the WB CQI) is reported for each SB of the CSI reporting band for the regular slot(s), and one offset value is reported for each SB of the CSI reporting band for the SBFD slot(s). Each offset value is determined with respect to the (WB+SB) CQI value for the corresponding SB. In one example, each offset value is selected/indicated via 1-bit or two-bit indicator or three-bit indicator. In this example, the total number of CQIs is $1+N_{SB,regular}+N_{SB,SBFD}$. Here, 1 is the number of WB CQI, $N_{SB,regular}$ is the number of SB CQIs, and $N_{SB,SBFD}$ is the number of offset values.

In one example, one WB CQI is reported for both regular slot(s) and SBFD slot(s) (i.e., WB-CQI common), and one differential SB CQI (with respect to the WB CQI) is reported for each SB of the CSI reporting band for the SBFD slot(s). The (WB+)SB CQIs are also applicable to regular slot(s) (for overlapping SBs between regular and SBFD slots) (i.e., SB-CQI-common), i.e., the total number of CQIs is $1+N_{SB,SBFD}$. In one example, the missing SB part for CQI reporting for the regular slot(s) is handled by gNB implementation.

In one example, one WB CQI is reported for both regular slot(s) and SBFD slot(s) (i.e., WB-CQI common), and one differential SB CQI (with respect to the WB CQI) is reported for each SB of the CSI reporting band for the SBFD slot(s), and one differential SB CQI value is reported for each of the missing (remaining) SBs for the regular slot(s). In this case, the total number of CQIs is $1+N_{SB,regular}$.

In one example, one WB CQI is reported for both regular slot(s) and SBFD slot(s) (i.e., WB-CQI common), and one differential SB CQI (with respect to the WB CQI) is reported for each SB of the CSI reporting band for the SBFD slot(s). The (WB+)SB CQIs are also applicable to regular slot(s) (for overlapping SBs between regular and SBFD slots) (i.e., SB-CQI-common) except SBs that are near the discontinuities between DL and UL for SBFD slot(s). For example, if 'DUD' FD pattern is considered for the SBFD slot(s), there are two discontinuities between DL and UL. For each of the two discontinuities, Y SBs that are near the discontinuity are the SBs for which offset values are further reported. Each offset value is determined with respect to the (WB+SB) CQI value for the corresponding SB. In one example, Y=1. In another example, Y=2 or other value. In one example, Y is fixed/predetermined, or configured by NW or determined and reported by the UE. In one example, each offset value is selected/indicated via 1-bit or two-bit indicator or three-bit indicator. In this example, the total number of CQIs is $1+Y+N_{SB,SBFD}$ (for 'UD' or 'DU' FD patterns) or $1+2Y+N_{SB,SBFD}$ (for 'DUD' FD pattern). Here, 1 is the number of WB CQI, $N_{SB,SBFD}$ is the number of SB CQIs, and Y or 2Y is the number of offset values. In one example, the missing SB part for CQI reporting for the regular slot(s) is handled by gNB implementation.

In one example, one WB CQI is reported for both regular slot(s) and SBFD slot(s) (i.e., WB-CQI common), and one differential SB CQI (with respect to the WB CQI) is reported for each SB of the CSI reporting band for the SBFD slot(s), and one differential SB CQI value is reported for each of the missing (remaining) SBs for the regular slot(s). The (WB+)SB CQIs are also applicable to regular slot(s) (for overlapping SBs between regular and SBFD slots) (i.e., SB-CQI-common) except SBs that are near the discontinuities between DL and UL for SBFD slot(s). For example, if 'DUD' FD pattern is considered for the SBFD slot(s), there are two discontinuities between DL and UL. For each of the two discontinuities, Y SBs that are near the discontinuity are the SBs for which offset values are further reported. Each offset value is determined with respect to the (WB+SB) CQI value for the corresponding SB. In one example, Y=1. In another example, Y=2 or other value. In one example, Y is fixed/predetermined, or configured by NW or determined and reported by the UE. In one example, each offset value is selected/indicated via 1-bit or two-bit indicator or three-bit indicator. In this example, the total number of CQIs is $1+Y+N_{SB,regular}$ (for 'UD' or 'DU' FD patterns) or $1+2Y+N_{SB,regular}$ (for 'DUD' FD pattern). Here, 1 is the number of WB CQI, $N_{SB,regular}$ is the number of SB CQIs, and Y or 2Y is the number of offset values.

In one example, one WB CQI is reported for both regular slot(s) and SBFD slot(s) (i.e., WB-CQI common), and one differential SB CQI (with respect to the WB CQI) is reported for each SB of the CSI reporting band for the SBFD slot(s), and one offset value is reported for each of the overlapping SBs (between SBFD and regular slots) for the regular slot(s). Each offset value is determined with respect to the (WB+SB) CQI value for the corresponding SB. In one example, each offset value is selected/indicated via 1-bit or two-bit indicator or three-bit indicator. In this example, the total number of CQIs is $1+2N_{SB,SBFD}$. Here, 1 is the number of WB CQI, $N_{SB,SBFD}$ is the number of SB CQIs, and $N_{SB,SBFD}$ is the number of offset values.

In one example, one WB CQI is reported for both regular slot(s) and SBFD slot(s) (i.e., WB-CQI common), and one differential SB CQI (with respect to the WB CQI) is reported for each SB of the CSI reporting band for the SBFD slot(s), and one offset value is reported for each of the overlapping SBs (between SBFD and regular slots) for the regular slot(s), and one differential SB CQI value is reported for each of the missing (remaining) SBs for the regular slot(s). Each offset value is determined with respect to the (WB+SB) CQI value for the corresponding SB. In one example, each offset value is selected/indicated via 1-bit or two-bit indicator or three-bit indicator. In this example, the total number of CQIs is $1+N_{SB,regular}+N_{SB,SBFD}$. Here, 1 is the number of WB CQI, $N_{SB,regular}$ is the number of SB CQIs, and $N_{SB,SBFD}$ is the number of offset values.

In one example, the joint CQI reporting for regular slot(s) and SBFD slot(s) is fixed. In one example, one of the above examples is configured via higher layer parameter cqiFormatIndicator.

In one example, the joint CQI reporting for regular slot(s) and SBFD slot(s) is UE-capability. This reporting can be via UE capability reporting, wherein the UE reports the one or multiple joint CQI reporting ways it supports (when configured, the joint CQI reporting is configured subject to the UE capability reporting). Or this reporting can be via a CSI report (either separate or together with another CSI report). In this case, a two-part UCI can be used and an information about the joint CQI reporting is included in UCI part 1.

In one example, the number of CQIs joint across FD SBs for regular/SBFD slot(s) (denote as $X_{regular\text{-}SBFD}$) is configured. When $X_{regular\text{-}SBFD}=1$, the CQI is according to one or more examples herein. When $X_{regular\text{-}SBFD}>1$, the CQI is according to one or more examples herein.

In one example, for CQI reporting related to SBFD slot(s) described in one or more examples herein, SBs that are near discontinuities between DL and UL for SBFD slot(s) can be regarded as no reporting SBs, i.e., no SB CQIs are reported for the SBs. For example, if 'DUD' FD pattern is considered for the SBFD slot(s), there are two discontinuities (e.g., guard bands) between DL and UL. For each of the two discontinuities, Z SBs that are near the discontinuity are the SBs for which no SB CQIs are reported.

In one example, Z is fixed/pre-determined, e.g., Z=1. In one example, Z is configured by NW. In one example, Z is determined by the UE and reported in CSI part 1.

In one embodiment, a UE is configured to perform a CSI reporting periodically, semi-persistently, or aperiodically, for up to N multiple hypotheses, e.g., N=2 two hypotheses. In one example, when N=2, one hypothesis corresponds to CQI reporting for regular slot(s)/symbol(s) (e.g., DL slot(s)) and the other hypothesis corresponds to CQI reporting for SBFD slot(s)/symbol(s).

In one example, at least one of the following examples is used to perform periodic CSI reporting (via higher-layer signaling, e.g., RRC) for both regular and SBFD slot(s)/symbols or either regular/SBFD slot(s)/symbol(s).

In one example, the CSI reporting includes CQI(s) for both of the hypotheses (for regular/SBFD slot(s)) for every periodic reporting. For example, the CQI(s) can be according to at least one or more examples herein.

In one example, the CSI reporting includes CQI(s) for one hypothesis (either regular slot(s) or SBFD slot(s)) circularly for every periodic reporting. For example, the CQI(s) for regular slot(s) is reported for $1^{st}$, $3^{rd}$, $5^{th}$, . . . periodic reporting instances, whereas the CQI(s) for SBFD slot(s) is reported for $2^{nd}$, $4^{th}$, $6^{th}$, . . . , periodic reporting instances. Or vice versa. In one example, the CQI(s) for regular slot(s) can be according to at least one of the examples under I.1.1. In one example, the CQI(s) for SBFD slot(s) can be according to one or more examples herein.

In one example, the CSI reporting includes CQI(s) for one fixed hypothesis (either regular slot(s) or SBFD slot(s)) for every periodic reporting. For example, the CQI(s) for regular slot(s) is reported for every periodic reporting. In another example the CQI(s) for SBFD slot(s) is reported every periodic reporting. In one example, the CQI(s) for regular slot(s) can be according to one or more examples herein. In one example, the CQI(s) for SBFD slot(s) can be according to one or more examples herein.

In one example, at least one of the following examples is used to perform semi-persistent CSI reporting (via higher-layer signaling, e.g., RRC, and/or MAC-CE signaling for activation/deactivation) for both regular and SBFD slot(s)/symbols or either regular/SBFD slot(s)/symbol(s).

In one example, semi-persistent CSI reporting can be activated via MAC-CE signaling for both regular slot(s) and SBFD slot(s) (at one shot).

In one example, semi-persistent CSI reporting can be activated via MAC-CE signaling for either regular slot(s) or SBFD slot(s).

In one example, semi-persistent CSI reporting can be deactivated via MAC-CE signaling for both regular slot(s) and SBFD slot(s) (at one shot).

In one example, semi-persistent CSI reporting can be deactivated via MAC-CE signaling for either regular slot(s) or SBFD slot(s).

In one example, the CSI reporting includes CQI(s) for both of the hypotheses (for regular/SBFD slot(s)) for every reporting instance once it is activated. For example, the CQI(s) can be according to at least one of the examples herein.

In one example, the CSI reporting includes CQI(s) for one hypothesis (either regular slot(s) or SBFD slot(s)) circularly for every reporting instance once it is activated. For example, the CQI(s) for regular slot(s) is reported for $1^{st}$, $3^{rd}$, $5^{th}$, . . . reporting instances, whereas the CQI(s) for SBFD slot(s) is reported for $2^{nd}$, $4^{th}$, $6^{th}$, . . . , reporting instances. Or vice versa. In one example, the CQI(s) for regular slot(s) can be according to one or more examples herein. In one example, the CQI(s) for SBFD slot(s) can be according to one or more examples herein.

In one example, the CSI reporting includes CQI(s) for one fixed hypothesis (either regular slot(s) or SBFD slot(s)) for every reporting instance once it is activated. For example, the CQI(s) for regular slot(s) is reported for every reporting instance. In another example the CQI(s) for SBFD slot(s) is reported every reporting instance. In one example, the CQI(s) for regular slot(s) can be according to one or more examples herein. In one example, the CQI(s) for SBFD slot(s) can be according to one or more examples herein.

In one example, at least one of the following examples is used to perform aperiodic CSI reporting (via DCI signaling) for both regular and SBFD slot(s)/symbols or either regular/SBFD slot(s)/symbol(s).

In one example, aperiodic CSI reporting can be indicated to perform via DCI signaling for both regular slot(s) and SBFD slot(s) (at one shot).

In one example, aperiodic CSI reporting can be indicated to perform via DCI signaling for either regular slot(s) or SBFD slot(s).

In one example, the CSI reporting includes CQI(s) for both of the hypotheses (for regular/SBFD slot(s)) for the aperiodic reporting. For example, the CQI(s) can be according to one or more examples herein.

In one example, the CSI reporting includes CQI(s) for one hypothesis (either regular slot(s) or SBFD slot(s)) for the aperiodic reporting. For example, the CQI(s) for regular slot(s) is reported. In another example the CQI(s) for SBFD slot(s) is reported. In one example, the CQI(s) for regular slot(s) can be according to one or more examples herein. In one example, the CQI(s) for SBFD slot(s) can be according to one or more examples herein.

Figure 15:
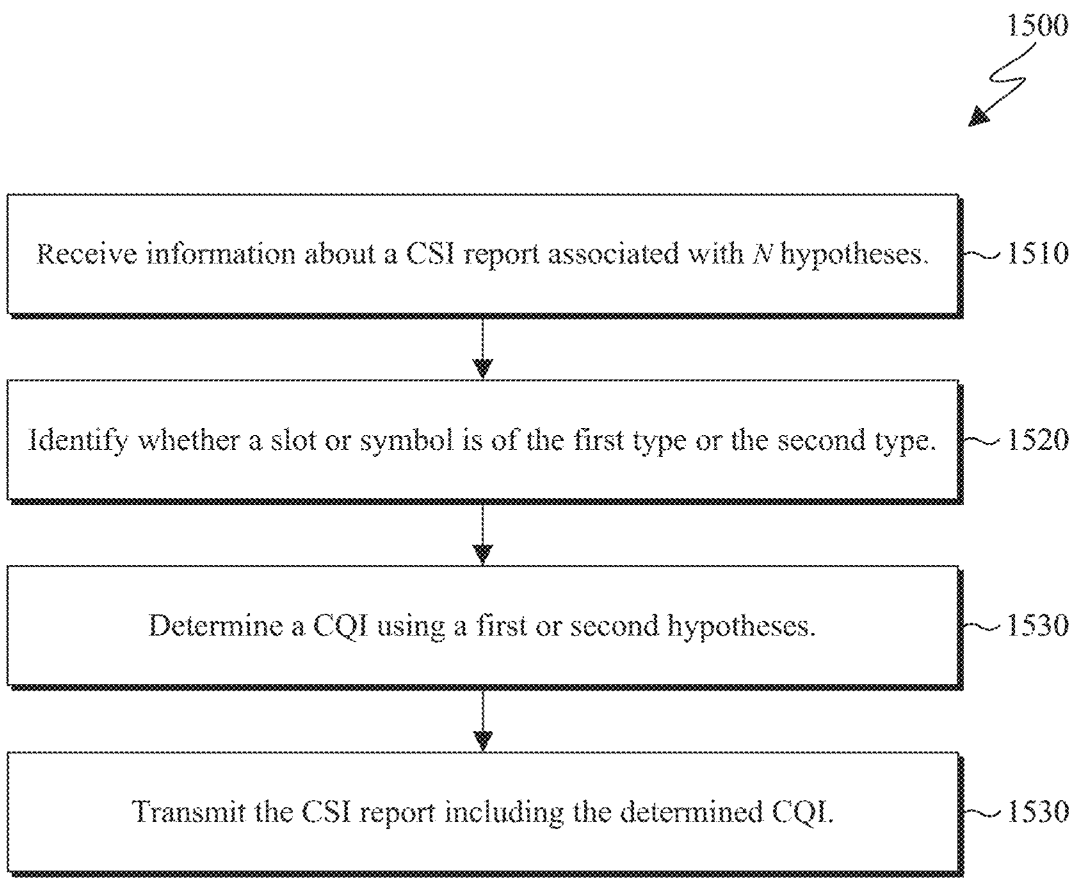
FIG. 15 illustrates an example method performed by a UE in a wireless communication system according to embodiments of the present disclosure.

FIG. 15 illustrates an example method 1500 performed by a UE in a wireless communication system according to embodiments of the present disclosure. The method 1500 of FIG. 15 can be performed by any of the UEs 111-116 of FIG. 1, such as the UE 116 of FIG. 3, and a corresponding method can be performed by any of the BSs 101-103 of FIG. 1, such as BS 102 of FIG. 2. The method 1500 is for illustration only and other embodiments can be used without departing from the scope of the present disclosure.

The method 1500 begins with the UE receiving information about a CSI report associated with N hypotheses 1510. For example, in 1510, a first hypothesis of the N hypotheses is associated with a CQI for SBFD slots or symbols and a second hypothesis of the N hypotheses is associated with a CQI for non-SBFD slots or symbols. The UE then identifies whether a slot or symbol is SBFD or non-SBFD 1520.

The UE then determines a CQI using the first or second hypotheses 1530. For example, in 1530 the determination is based on the identification of whether a slot or symbol is SBFD or non-SBFD in 1520, where the first hypothesis is used for SBFD slots and the second hypothesis is used for non-SBFD slots.

In various embodiments, the CQI associated with the first hypothesis includes a first wideband (WB) CQI and $N_{SB,SBFD}$ sub-band (SB) CQIs. The CQI associated with the second hypothesis includes a second WB CQI and $N_{SB,regular}$ SB CQIs. Here, $N_{SB,SBFD}$ and $N_{SB,regular}$ are related to a number of configured SBs for the SBFD and non-SBFD slots or symbols, respectively.

In various embodiments, the CQIs for the first and second hypotheses include a common wideband (WB) CQI, common $N_{SB,regular}$ sub-band (SB) CQIs, and X CQI offsets for the first hypothesis, where $N_{SB,regular}$ is related to a number of configured SBs for the non-SBFD slots or symbols. In some examples, each of the X CQI offsets is indicated via 1, 2, or 3 bit indicator. In some examples, X=aY, where a≥1 is a number of discontinuities among downlink (DL) and uplink (UL) bandwidths in the SBFD slots or symbols, and Y is a number of SBs. In some examples, Y is fixed, determined by the UE, or configured by radio resource control (RRC), multiple access channel control element (MAC-CE), or downlink control information DCI signaling.

The UE then transmits the CSI report including the determined CQI 1540. In various embodiments, the CSI report includes a CSI Part 1 and a CSI Part 2. The CSI part 1 includes an indication indicating one or more hypotheses from the N hypotheses used to determine the CQI. The CSI part 2 includes the determined CQI corresponding to the one or more hypotheses. In some examples, the indication is via an N-bit bitmap indicator.

Any of the above variation embodiments can be utilized independently or in combination with at least one other variation embodiment.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) comprising:

a transceiver configured to receive information about a channel state information (CSI) report associated with N>1 hypotheses, wherein:

a first hypothesis of the N hypotheses is associated with a channel quality indicator (CQI) for a first type of slots or symbols, and a second hypothesis of the N hypotheses is associated with a CQI for a second type of slots or symbols; and a processor operably coupled to the transceiver, the processor configured to:

identify whether a slot or symbol is of the first type or the second type; and determine, based on the identification, a CQI using the first or second hypotheses;

wherein the transceiver is further configured to transmit the CSI report including the determined CQI, wherein the first type of slots or symbols correspond to subband full duplex (SBFD) slots or symbols, and wherein the second type of slots or symbols correspond to non-SBFD slots or symbols.

2. The UE of claim 1, wherein:

the CQI associated with the first hypothesis includes a first wideband (WB) CQI and $N_{SB,SBFD}$ sub-band (SB) CQIs, and the CQI associated with the second hypothesis includes a second WB CQI and $N_{SB,regular}$ SB CQIs, where $N_{SB,SBFD}$ and $N_{SB,regular}$ are related to a number of configured SBs for the SBFD and non-SBFD slots or symbols, respectively.

3. The UE of claim 1, wherein the CQIs for the first and second hypotheses include a common wideband (WB) CQI, common $N_{SB,regular}$ sub-band (SB) CQIs, and X CQI offsets for the first hypothesis, where $N_{SB,regular}$ is related to a number of configured SBs for the non-SBFD slots or symbols.

4. The UE of claim 3, wherein each of the X CQI offsets is indicated via 1, 2, or 3 bit indicator.

5. The UE of claim 3, wherein X=aY, where a≥1 is a number of discontinuities among downlink (DL) and uplink (UL) bandwidths in the SBFD slots or symbols, and Y is a number of SBs.

6. The UE of claim 5, wherein Y is:

fixed, determined by the UE, or configured by radio resource control (RRC), multiple access channel control element (MAC-CE), or downlink control information DCI signaling.

7. The UE of claim 1, wherein:

the CSI report includes a CSI Part 1 and a CSI Part 2, the CSI part 1 includes an indication indicating one or more hypotheses from the N hypotheses used to determine the CQI, and the CSI part 2 includes the determined CQI corresponding to the one or more hypotheses.

8. The UE of claim 7, wherein the indication is via an N-bit bitmap indicator.

9. A base station (BS) comprising:

a processor; and a transceiver operably coupled to the processor, the transceiver configured to:

transmit information about a channel state information (CSI) report associated with N>1 hypotheses, wherein:

a first hypothesis of the N hypotheses is associated with a channel quality indicator (CQI) for a first type of slots or symbols, and a second hypothesis of the N hypotheses is associated with a CQI for a second type of slots or symbols; and receive the CSI report including a CQI that is associated with the first or second hypotheses based on whether a slot or symbol is of the first type or the second type, wherein the first type of slots or symbols correspond to subband full duplex (SBFD) slots or symbols, and wherein the second type of slots or symbols correspond to non-SBFD slots or symbols.

10. The BS of claim 9, wherein:

the CQI associated with the first hypothesis includes a first wideband (WB) CQI and $N_{SB,SBFD}$ sub-band (SB) CQIs, and the CQI associated with the second hypothesis includes a second WB CQI and $N_{SB,regular}$ SB CQIs, where $N_{SB,SBFD}$ and $N_{SB,regular}$ are related to a number of configured SBs for the SBFD and non-SBFD slots or symbols, respectively.

11. The BS of claim 9, wherein the CQIs for the first and second hypotheses include a common wideband (WB) CQI, common $N_{SB,regular}$ sub-band (SB) CQIs, and X CQI offsets for the first hypothesis, where $N_{SB,regular}$ is related to a number of configured SBs for the non-SBFD slots or symbols.

12. The BS of claim 11, wherein each of the X CQI offsets is indicated via 1, 2, or 3 bit indicator.

13. The BS of claim 11, wherein X=aY, where a≥1 is a number of discontinuities among downlink (DL) and uplink (UL) bandwidths in the SBFD slots or symbols, and Y is a number of SBs.

14. The BS of claim 13, wherein Y is:

fixed, determined by a user equipment, or configured by radio resource control (RRC), multiple access channel control element (MAC-CE), or downlink control information DCI signaling.

15. The BS of claim 9, wherein:

the CSI report includes a CSI Part 1 and a CSI Part 2, the CSI part 1 includes an indication indicating one or more hypotheses from the N hypotheses used to determine the CQI, and the CSI part 2 includes the determined CQI corresponding to the one or more hypotheses.

16. The BS of claim 15, wherein the indication is via an N-bit bitmap indicator.

17. A method performed by a user equipment (UE), the method comprising:

receiving information about a channel state information (CSI) report associated with N>1 hypotheses, wherein:

a first hypothesis of the N hypotheses is associated with a channel quality indicator (CQI) for a first type of slots or symbols, and a second hypothesis of the N hypotheses is associated with a CQI for a second type of slots or symbols; and identifying whether a slot or symbol is of the first type or the second type;

determining, based on the identification, a CQI using the first or second hypotheses; and transmitting the CSI report including the determined CQI, wherein the first type of slots or symbols correspond to subband full duplex (SBFD) slots or symbols, and wherein the second type of slots or symbols correspond to non-SBFD slots or symbols.

18. The method of claim 17, wherein:

the CQI associated with the first hypothesis includes a first wideband (WB) CQI and $N_{SB,SBFD}$ sub-band (SB) CQIs, and the CQI associated with the second hypothesis includes a second WB CQI and $N_{SB,regular}$ SB CQIs, where $N_{SB,SBFD}$ and $N_{SB,regular}$ are related to a number of configured SBs for the SBFD and non-SBFD slots or symbols, respectively.

19. The method of claim 17, wherein the CQIs for the first and second hypotheses include a common wideband (WB) CQI, common $N_{SB,regular}$ sub-band (SB) CQIs, and X CQI offsets for the first hypothesis, where $N_{SB,regular}$ is related to a number of configured SBs for the non-SBFD slots or symbols.

20. The method of claim 19, wherein X=aY, where a≥1 is a number of discontinuities among downlink (DL) and uplink (UL) bandwidths in the SBFD slots or symbols, and Y is a number of SBs.

* * * * *